US011093422B2

(12) United States Patent
Lambert et al.

(10) Patent No.: US 11,093,422 B2
(45) Date of Patent: Aug. 17, 2021

(54) PROCESSOR/ENDPOINT COMMUNICATION COUPLING CONFIGURATION SYSTEM

(71) Applicant: Dell Products L.P., Round Rock, TX (US)

(72) Inventors: Timothy M. Lambert, Austin, TX (US); Hendrich M. Hernandez, Round Rock, TX (US); Yogesh Varma, Sugar Land, TX (US); Kurtis John Bowman, Austin, TX (US); Shyamkumar T. Iyer, Cedar Park, TX (US); John Christopher Beckett, New Braunfels, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/741,361

(22) Filed: Jan. 13, 2020

(65) Prior Publication Data
US 2020/0341919 A1 Oct. 29, 2020

Related U.S. Application Data

(63) Continuation of application No. 16/395,468, filed on Apr. 26, 2019, now Pat. No. 10,534,734.

(51) Int. Cl.
*G06F 13/20* (2006.01)
*G06F 13/42* (2006.01)

(52) U.S. Cl.
CPC ......... *G06F 13/20* (2013.01); *G06F 13/4221* (2013.01); *G06F 2213/0026* (2013.01)

(58) Field of Classification Search
CPC .. G06F 11/0757; G06F 13/4022; H04L 67/10; H04L 49/70
(Continued)

(56) References Cited

U.S. PATENT DOCUMENTS 5,787,246 A 7/1998 Lichtman et al.
8,725,923 B1 * 5/2014 Frangioso ........... G06F 11/3082
710/306

(Continued)

OTHER PUBLICATIONS

PCT International Search Report and Written Opinion, Application No. PCT/US2020/029818, dated Jul. 9, 2020.
(Continued)

*Primary Examiner* — Titus Wong
(74) *Attorney, Agent, or Firm* — Haynes and Boone, LLP

(57) ABSTRACT

A processor/endpoint communication coupling configuration system includes a plurality of processing subsystems coupled to a multi-endpoint adapter device by a plurality of communication couplings included on at least one hardware subsystem. A communication coupling configuration engine identifies each at least one hardware subsystem, determines at least one communication coupling configuration capability of the plurality of communication couplings, and determines at least one first multi-endpoint adapter device capability of the multi-endpoint adapter device. The communication coupling configuration engine then configures the plurality of communication couplings based on the at least one hardware subsystem, the at least one communication configuration capability, and the at least one first multi-endpoint adapter device capability in order to provide at least one communication resource between at least one of the plurality of processing subsystems and at least one endpoint on the first multi-endpoint adapter device.

20 Claims, 27 Drawing Sheets

(58) Field of Classification Search
USPC .......................................................... 710/10
See application file for complete search history.

(56) References Cited

U.S. PATENT DOCUMENTS

| | | | |
|---|---|---|---|
| 8,917,734 B1* | 12/2014 | Brown | .................... H04L 49/35 370/400 |
| 9,842,075 B1 | 12/2017 | Davis | |
| 2002/0133608 A1 | 9/2002 | Godwin et al. | |
| 2002/0178268 A1 | 11/2002 | Aiken et al. | |
| 2003/0091046 A1 | 5/2003 | Fang et al. | |
| 2006/0098635 A1* | 5/2006 | Ravindranath | ..... H04L 65/1069 370/352 |
| 2007/0086430 A1 | 4/2007 | Kemp | |
| 2007/0285503 A1 | 12/2007 | Asthana et al. | |
| 2008/0052443 A1* | 2/2008 | Cassiday | ............. G06F 13/4022 710/316 |
| 2009/0063741 A1 | 3/2009 | Lu | |
| 2009/0067441 A1* | 3/2009 | Ansari | ................ H04L 12/2818 370/401 |
| 2009/0268713 A1 | 10/2009 | Ottur et al. | |
| 2009/0276551 A1 | 11/2009 | Brown et al. | |
| 2010/0238789 A1 | 9/2010 | Qiu et al. | |
| 2014/0059265 A1* | 2/2014 | Iyer | ........................... G06F 9/46 710/313 |
| 2014/0195711 A1* | 7/2014 | Bhatia | ................... G06F 3/0664 710/313 |
| 2014/0280947 A1* | 9/2014 | Christopher | ............ H04L 61/00 709/226 |
| 2015/0347345 A1 | 12/2015 | Hellriegel et al. | |
| 2016/0164810 A1 | 6/2016 | Wolz et al. | |
| 2016/0328344 A1* | 11/2016 | Jose | .................... G06F 13/4022 |
| 2017/0063968 A1 | 3/2017 | Kitchen et al. | |
| 2017/0155573 A1* | 6/2017 | Khemani | ................ H04L 25/00 |
| 2017/0269943 A1* | 9/2017 | Kumar | .................... G06F 9/4411 |
| 2017/0289203 A1 | 10/2017 | Niranjan et al. | |
| 2018/0101498 A1 | 4/2018 | Cosby | |

OTHER PUBLICATIONS

"What is PCIe port bifurcation?—Quora," Apr. 25, 2019, Quora, 2 pages, https://www.quora.com/What-is-PCLe-port-bifurcation.

* cited by examiner

US 11,093,422 B2

PROCESSOR/ENDPOINT COMMUNICATION COUPLING CONFIGURATION SYSTEM

PRIORITY DATA

This application is a continuation application of U.S. application Ser. No. 16/395,468, filed Apr. 26, 2019, issuing Jan. 14, 2020, as U.S. Pat. No. 10,534,734, which is hereby incorporated by reference in its entirety.

BACKGROUND

The present disclosure relates generally to information handling systems, and more particularly to configuring communication couplings between processor(s) and endpoint(s) in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, may be configured to include multiple processors and utilize a Non-Uniform Memory Access (NUMA) computer memory design in which each processor is provided a local memory that it can access quickly, with those processors coupled together via processor interconnects (e.g., Ultra-Path Interconnects (UPIs) available in processing systems provided by INTEL® Corporation of Santa Clara, Calif., United States) that allow the processors to access memory that is local to the other processors. Furthermore, such server devices may be provided with multi-endpoint adapter devices that provide a plurality of endpoints (e.g., PCIe endpoints). Conventionally, the processors are coupled to the multi-endpoint adapter devices via hardware with fixed/static communication couplings in order to allow those processors to communicate with the endpoints to utilize resources available via those endpoints. The use of fixed/static communication couplings between the processors and endpoints prevents the scaling of server device (e.g., to provide additional processors in that server device) and does not take into account the endpoint devices connected to the processors. Furthermore, the fixed/static communication couplings can result in the use of the processor interconnects in endpoint communications, which reduces throughput via the processor interconnects (which are meant to allow processors to access neighboring processor root complexes) and increase latency in those communications. Further still, the fixed/static communication couplings in conventional systems require different hardware devices (e.g., motherboards and riser devices) for the server device in order to enable different processor/endpoint configurations.

Accordingly, it would be desirable to provide a processor/endpoint communication coupling configuration system.

SUMMARY

According to one embodiment, an Information Handling System (IHS) includes a first processing system; and a first memory system that is coupled to the first processing system and that includes instructions that, when executed by the first processing system, cause the first processing system to provide a communication coupling configuration engine that is configured to: identify at least one hardware subsystem that includes a plurality of communication couplings that couple a plurality of second processing subsystems to a first multi-endpoint adapter device; determine at least one communication coupling configuration capability of the plurality of communication couplings that couple the plurality of second processing subsystems to the first multi-endpoint adapter device; determine at least one first multi-endpoint adapter device capability of the first multi-endpoint adapter device; and configure the plurality of communication couplings based on the at least one hardware subsystem, the at least one communication configuration capability, and the at least one first multi-endpoint adapter device capability, wherein the configuration of the plurality of communication couplings provides at least one communication resource between at least one of the plurality of second processing subsystems and at least one endpoint on the first multi-endpoint adapter device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
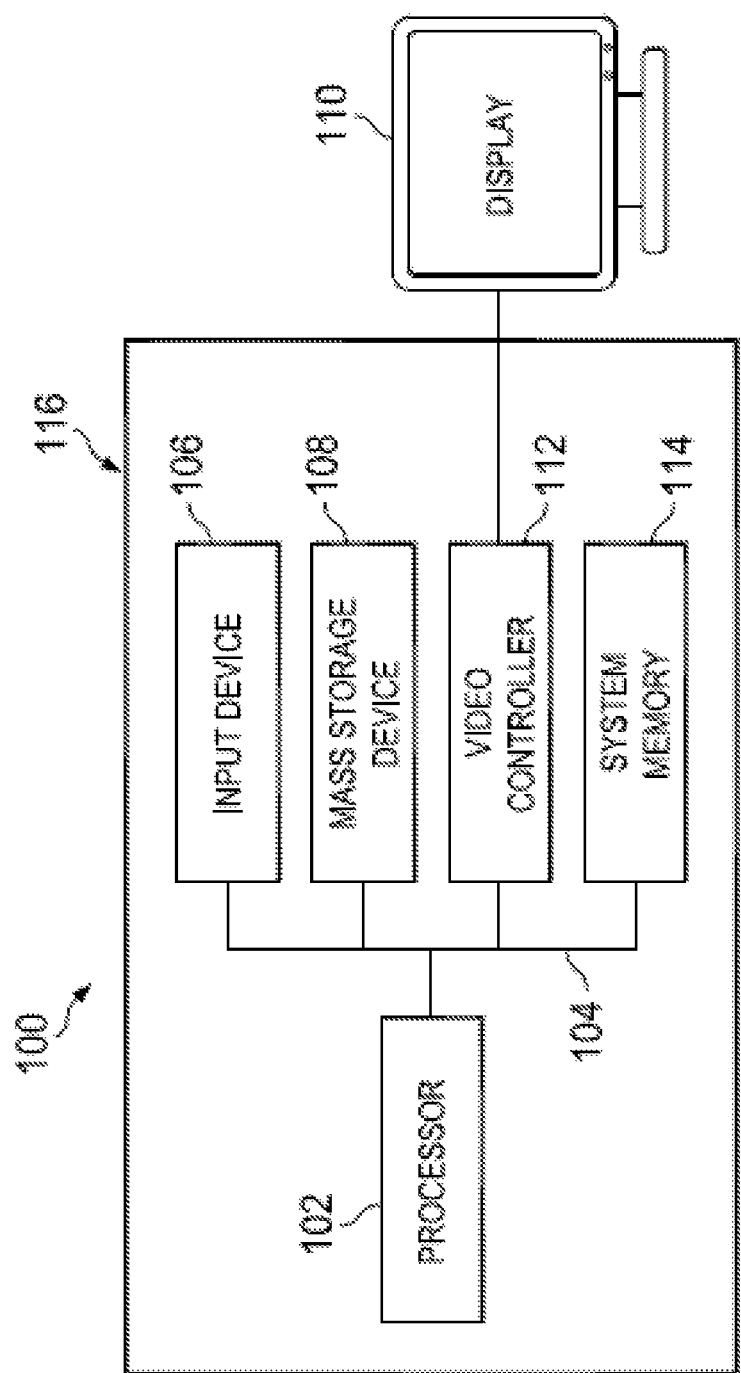
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
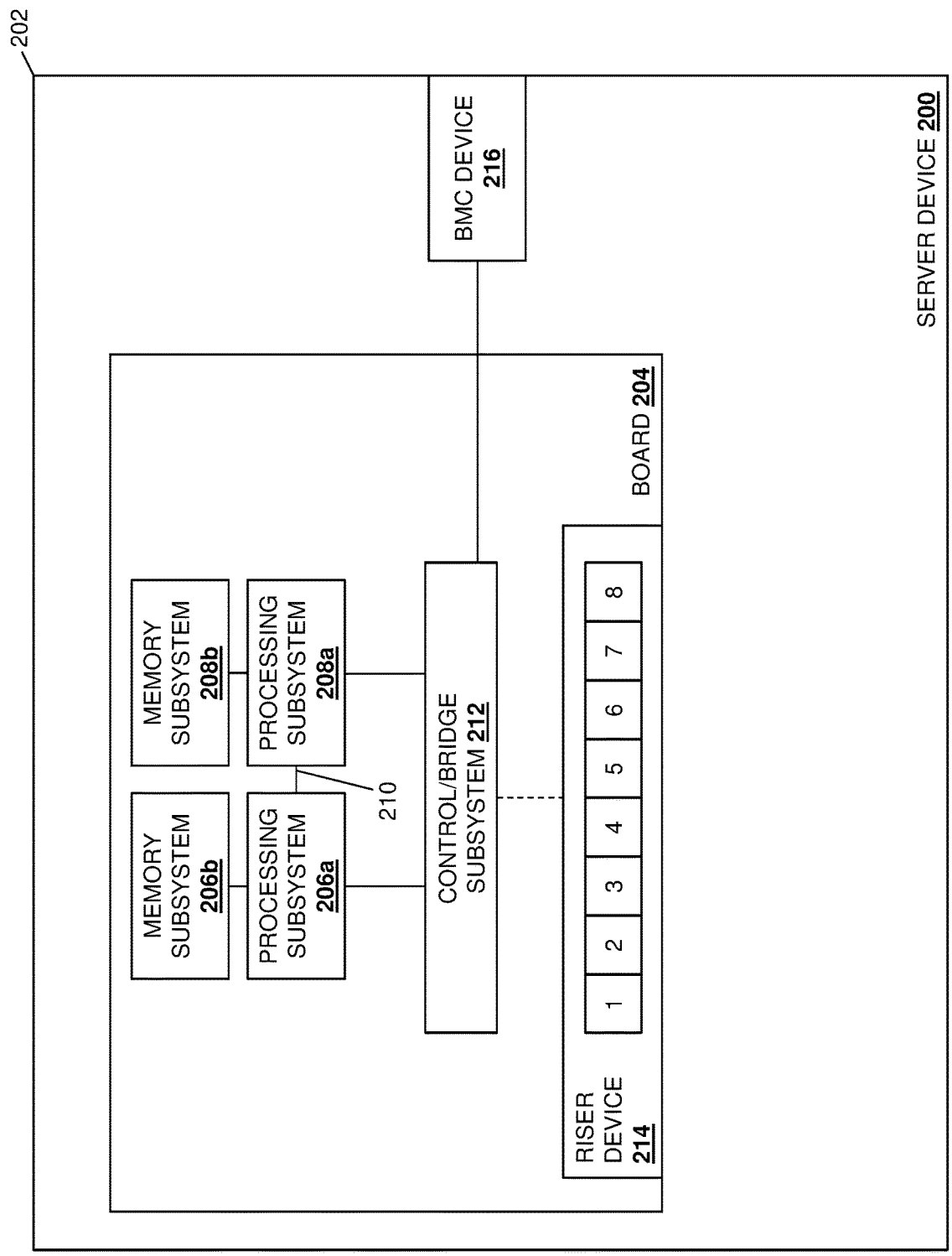
FIG. 2 is a schematic view illustrating an embodiment of a server device that provides an example of the processor/endpoint communication coupling configuration system of the present disclosure.

Referring now to FIG. 2, an embodiment of a server device 200 is illustrated that may provide the processor/endpoint communication coupling configuration system of the present disclosure. In an embodiment, the server device

200 may be provided by the IHS 100 discussed above with reference to FIG. 1 and/or may include some or all of the components of the IHS 100. Furthermore, while illustrated and discussed as a server device 200, one of skill in the art in possession of the present disclosure will recognize that the functionality of the server device 200 discussed below may be provided by other devices that are configured to operate similarly as discussed below. In the illustrated embodiment, the server device 200 includes a chassis 202 that houses the components of the server device 200, only some of which are illustrated below. For example, the chassis 202 may house a board 204 such as, for example, a motherboard and/or other circuit board that would be apparent to one of skill in the art in possession of the present disclosure. In at least some of the examples provided below, the board 204 (or at least portions of the board 204) may be considered a hardware subsystem in the server device 200 that provides communication couplings (e.g., traces, cabling, and/or other communication couplings known in the art) between the processing subsystems and endpoints discussed below.

A plurality of processing subsystems are provided on the board 204 and are coupled together via processing subsystem interconnects such as, for example, Ultra-Path Interconnects (UPI) available on processing systems provided by INTEL® corporation of Santa Clara, Calif., United States. For the purposes of some of the example provided below, the embodiment of the server device 200 illustrated in FIG. 2 provides an example of a two processor system having a processing subsystem 206a and a processing subsystem 208a included on the board 204 and coupled together via a UPI 210. Furthermore, each of the processing subsystems 206a and 208a are provided with, and connected to, respective memory subsystems 206b and 208b. For example, the processing subsystems and memory subsystems in the server device 200 may utilize a Non-Uniform Memory Access (NUMA) computer memory design in which each respective processing subsystem is connected a respective local memory subsystem to provide a respective NUMA node (i.e., the processing subsystem 206a and its local memory subsystem 206b provide a first NUMA node, and the processing subsystem 208a and its local memory subsystem 208b provide a second NUMA node.) However, while two processing subsystems/memory subsystems (e.g., two NUMA nodes) are illustrated in FIG. 2, as discussed below more processing subsystems/memory subsystems (e.g., NUMA nodes) may be provided according to the teachings of the present disclosure while falling within its scope as well.

In the illustrated embodiment, each of the processing subsystems 206a and 208a are coupled to a control/bridge subsystem 212 that may be provided on the board 204. In different examples, the control/bridge subsystem 212 may be provided by an analog bus exchange switch, a PCIe packet switch, and/or a variety of other control/bridge subsystems that would be apparent to one of skill in the art in possession of the present disclosure. While illustrated and described as a control/bridge subsystem, one of skill in the art in possession of the present disclosure will recognize that other subsystems may perform the functionality of the control/bridge subsystem 212 discussed below while remaining within the scope of the present disclosure as well. In the illustrated embodiment, the control/bridge subsystem 212 may be provided by hardware on the board 204 that is coupled to a riser device 214 that is included on the board 204 via, for example, traces and/or other communication couplings known in the art. In at least some of the examples provided below, the control/bridge subsystem 212 (or at least portions of the control/bridge subsystem 212), the riser device 214 (or at least portions of the riser device 214), and the board 204 that couples them together, may be considered hardware subsystem(s) in the server device 200 that provides communication couplings (e.g., traces, cabling, and/or other communication couplings known in the art) between the processing subsystems 206a and 208a and the endpoints discussed below.

In other embodiments, the control/bridge subsystem 212 may be provided as part of the riser device 214, included on a device (e.g., an expansion card) coupled to the board 204, and/or provided in a variety of other manners while remaining within the scope of the present disclosure as well In some examples, as discussed in further detail below, the communication coupling between the control/bridge subsystem 212 and the riser device 214 may be configurable by the control/bridge subsystem 212 and/or the riser device 214 (as indicated by the dashed line provided for that coupling in FIG. 2.) In the illustrated embodiment, the riser device 214 may include two x16 connectors (e.g., PCIe connectors) that provide the eight x4 connectors illustrated in FIG. 2 (e.g., the x4 connectors numbered "1", "2", "3", and "4" for the first x16 connector, and the x4 connectors "5", "6", "7", and "8" for the second x16 connector). In some embodiments, the riser device 214 may be configured to describe the one or more connection topologies on the board 204 to endpoints that are coupled to the riser device 214.

In the illustrated embodiment, a Baseboard Management Controller (BMC) device 216 is included in the chassis 202 and coupled to the control/bridge subsystem 212. For example, the BMC device 216 may be provided by an integrated DELL® Remote Access Controller (iDRAC) available from DELL® Inc. of Round Rock, Tex., United States, although other remote access controller devices and/or BMCs will fall within the scope of the present disclosure as well. In the embodiments discussed below, the BMC device 216 includes a BMC processing system that is coupled to a BMC memory system that includes instructions that, when executed by the BMC processing system, cause the BMC processing system to provide a communication coupling configuration engine that is configured to perform the functionality of the communication coupling configuration engines and BMC devices discussed below. However, one of skill in the art in possession of the present disclosure will recognize that the communication coupling configuration engine of the present disclosure may be provided by other hardware/software subsystems in the server device 200, and/or may be connected to the server device 200 (e.g., in a network-connected management system) while remaining within the scope of the present disclosure as well. While a specific server device 200 has been illustrated, one of skill in the art in possession of the present disclosure will recognize that server devices (or other devices operating according to the teachings of the present disclosure in a manner similar to that described below for the server device 200) may include a variety of components and/or component configurations for providing conventional server device functionality, as well as the functionality discussed below, while remaining within the scope of the present disclosure as well.

Figure 3:
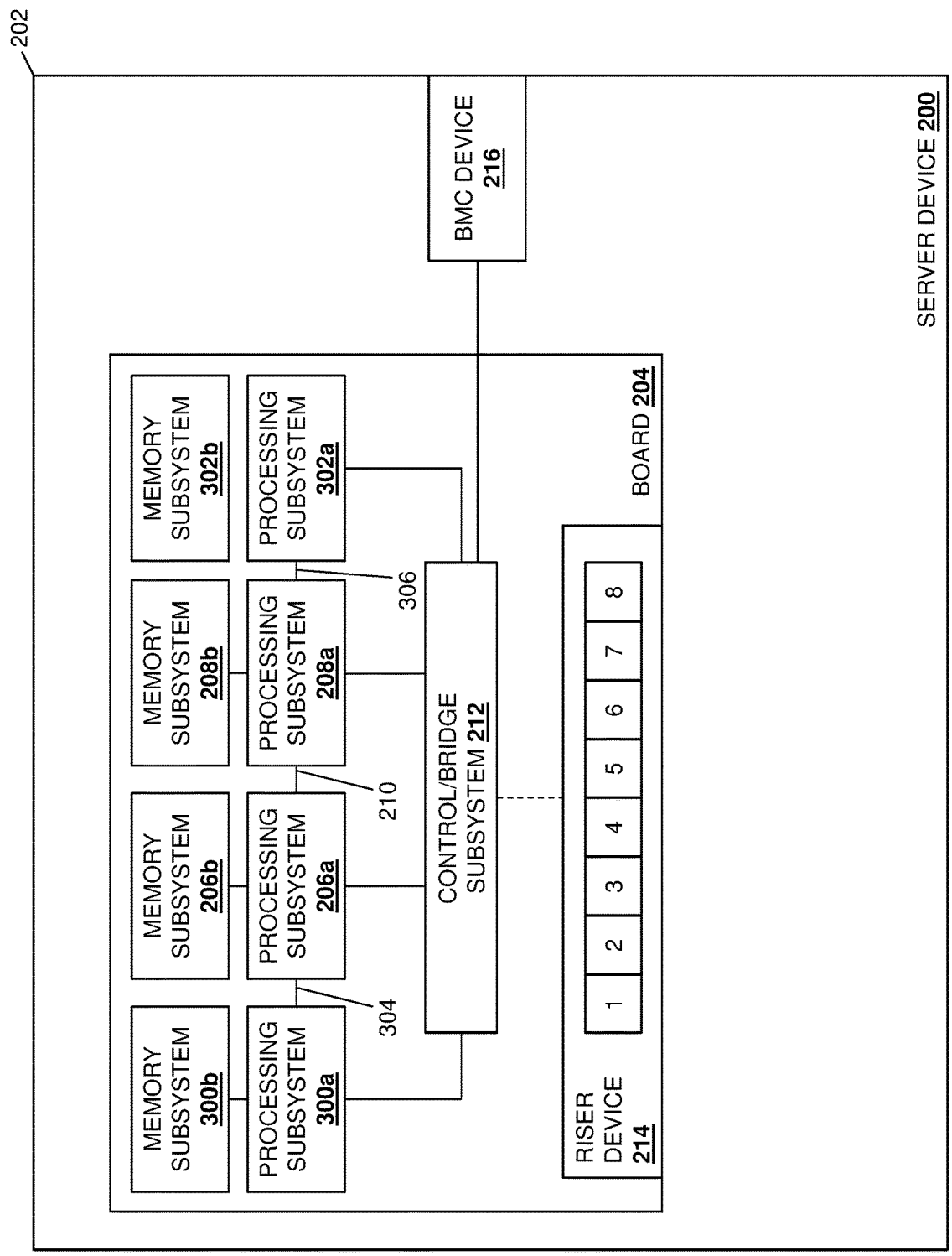
FIG. 3 is a schematic view illustrating an embodiment of a server device that provides an example of the processor/endpoint communication coupling configuration system of the present disclosure.
Figure 4:
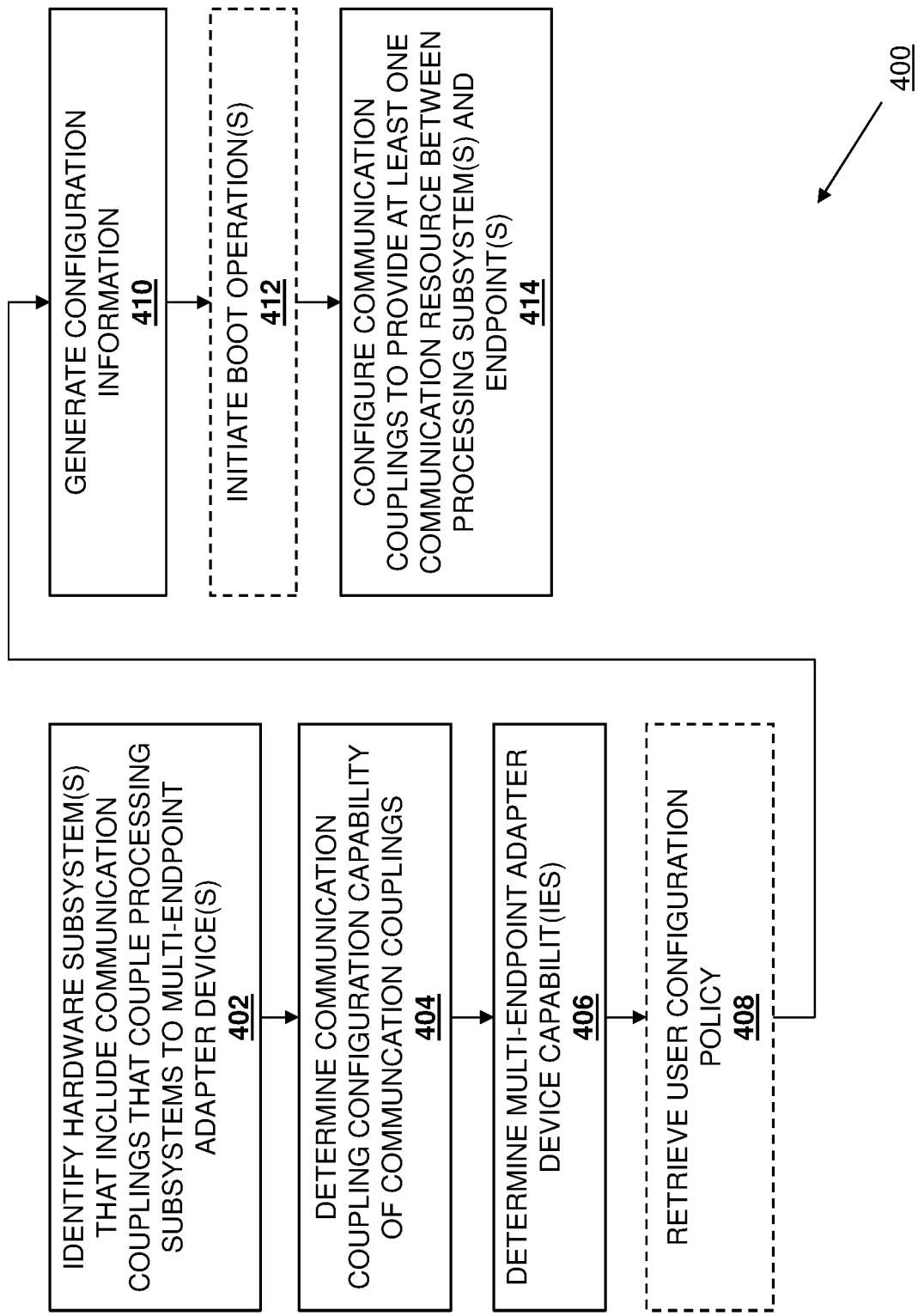
FIG. 4 is a flow chart illustrating an embodiment of a method for configuring communication couplings between processor(s) and endpoint(s).

With reference to FIG. 3, another embodiment of the server device 200 is illustrated. For the purposes of some of the examples provided below, the embodiment of the server device 200 illustrated in FIG. 4 provides an example of a four processor system having a processing subsystem 300a connected to the processing subsystem 206a via a UP 304, and a processing subsystem 302a connected to the processing subsystem 208a via a UPI 306. Similar to the processing subsystems 206a and 208a, each of the processing subsystems 300a and 302a are provided with and connected to respective memory subsystems 300b and 302. As discussed above, the processing subsystems and memory subsystems in the server device 200 may utilize a Non-Uniform Memory Access (NUMA) computer memory design in which each respective processing subsystem is connected a respective local memory subsystem to provide a respective NUMA node (i.e., the processing subsystem 300a and its local memory subsystem 300b provide a third NUMA node, and the processing subsystem 302a and its local memory subsystem 302b provide a fourth NUMA node.) However, while four processing subsystems/memory subsystems (e.g., four NUMA nodes) are illustrated in FIG. 3, one of skill in the art in possession of the present disclosure will recognize that more processing subsystems/memory subsystems (e.g., NUMA nodes) may be provided according to the teachings of the present disclosure while falling within its scope as well. In the illustrated embodiment, each of the processing subsystems 300a and 302a are coupled to the control/bridge subsystem 212 along with the processing subsystems 206a and 208a.

Referring now to FIG. 4, an embodiment of a method 400 for configuring communication couplings between processor(s) and endpoint(s) is illustrated. As discussed below, the systems and methods of the present disclosure provide for the configuration of communication couplings between one or more processing subsystems in a server device and one or more endpoints coupled to those processing subsystem(s) based on the hardware subsystems that provide those communication couplings, the communication coupling configuration capability of those communication couplings, and the capabilities of the multi-endpoint adapter device(s) that provide the endpoint(s). In some embodiments, the configuration of communication couplings between the one or more processing subsystems in the server device and the one or more endpoints coupled to those processing subsystem(s) may be based on a retrieved user configuration policy as well. In some embodiments, the configuration of communication couplings between the one or more processing subsystems and the one or more endpoints coupled to those processing subsystem(s) may be performed and applied during runtime of the server device, while in other embodiments, the configuration of communication couplings between the one or more processing subsystems and the one or more endpoint coupled to those processing subsystem(s) may require boot operations by the server device. As such, configurable communication couplings between the processing subsystem(s) and endpoint(s) are provided that enhance the scalability of server devices (e.g., to provide additional processing subsystems in that server device), while taking into account the endpoint devices connected to those processing subsystems, and allowing for a single motherboard and riser device to enable many different processing subsystem/endpoint configurations.

In the embodiments discussed below, multi-endpoint adapter device(s) may be coupled to the riser device 214. In the example illustrated and described below with reference to FIGS. 5A-5C, a multi-endpoint adapter device 500 is coupled to the riser device 214 (e.g., via one of the x16 connectors provided on the riser device 214 using the x4 connectors "1", "2", "3", and "4"), and includes a plurality of endpoints that are coupled to the riser device 214. For example, and as discussed in further detail below, the coupling between the endpoints provided on the multi-endpoint adapter device 500 and the riser device 214 may be configurable (as indicated by the dashed line provided for those couplings in FIG. 5A.) In a specific example, the endpoint provided on the multi-endpoint adapter device 500 may be provided by physical or virtual Peripheral Component Interconnect express (PCIe) endpoints such as, for example, the Network Interface Controller (NIC) 500a on the multi-endpoint adapter device 500, illustrated in FIG. 5A. As discussed in further detail below, the couplings between the control/bridge subsystem 212, the riser device 214, and the NIC 500a provide one or more hardware subsystems that include a plurality of communication couplings that may couple each of the plurality of endpoints (e.g., the NIC 500a) to at least one of the plurality of processing subsystems 206a and 208a in order to provide a respective subset of available communication resources in the server device 200 to each of the plurality of processing subsystems 206a and 208a.

Figure 5A:
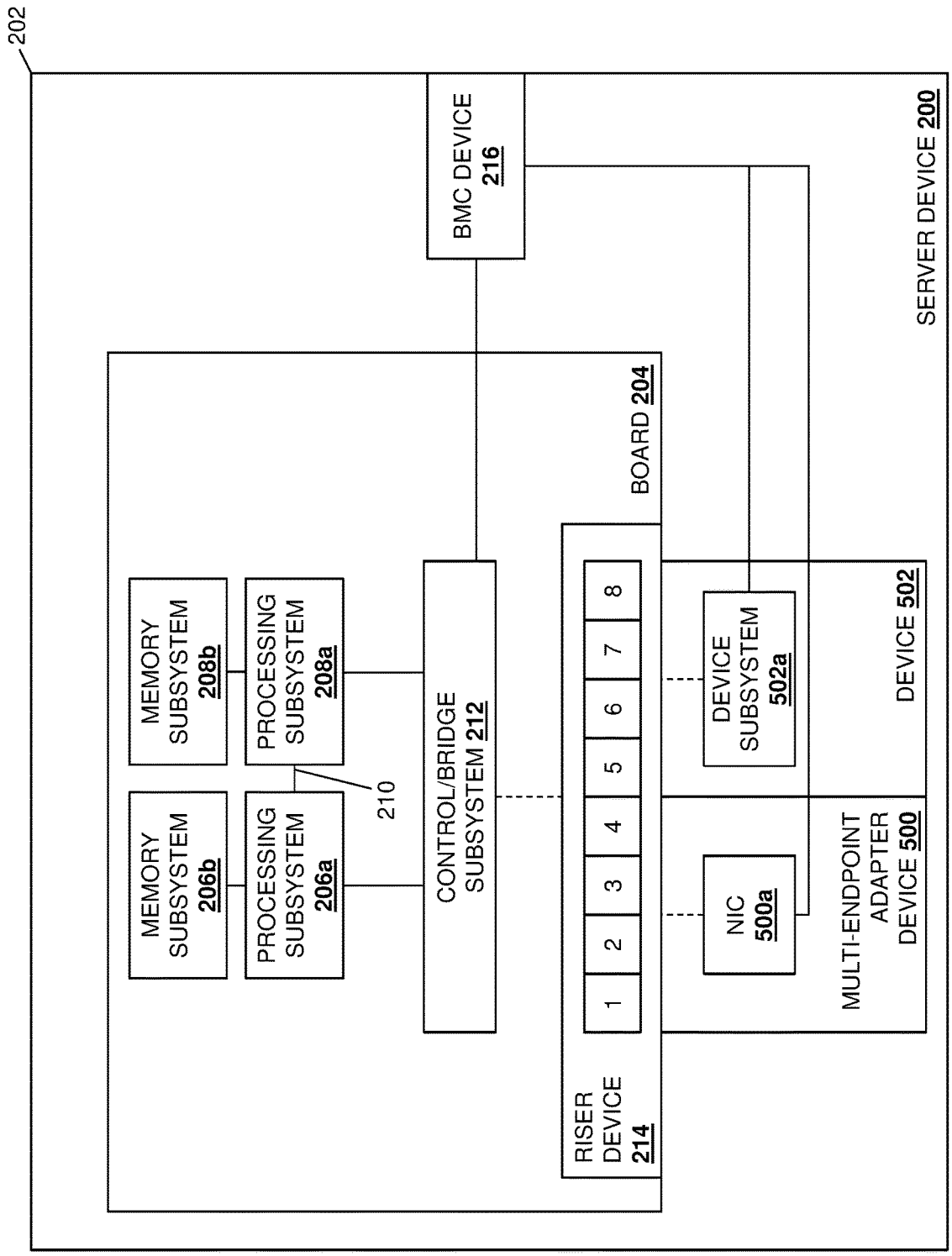
FIG. 5A is a schematic view illustrating an embodiment of processor/endpoint communication coupling configuration system in the server device of FIG. 2 during the method of FIG. 4.

In a specific example, the NIC 500a provides a "multi-PCIe-endpoint" that is configured to allow for the splitting of the resources of that NIC between multiple processing subsystems. For example, and as discussed below, the NIC 500a may be configured to split its respective x16 connection to the riser device 214 into two x8 connections to a pair of processing subsystems, or four x4 connections to each of four processing subsystems. However, while a specific example is described, one of skill in the art in possession of the present disclosure will recognize that other endpoints having other configurable connection capabilities will fall within the scope of the present disclosure as well. FIG. 5A also illustrates how another device 502 (e.g., a non-multi-endpoint adapter device) may be coupled to the riser device 214 and may provide a device subsystem 502a that is coupled to the riser device 214 by a configurable connection as well (as indicated by the dashed line provided for those couplings in FIG. 5A.) Furthermore, in the illustrated embodiment, the BMC device 216 is coupled to each of the NIC 500a and the device subsystem 502a.

In the example illustrated and described below with reference to FIGS. 6A-6C, a pair of devices 600 and 602 (e.g., non-multi-endpoint adapter devices such as conventional add-in cards) may be coupled to the riser device 214 (e.g., via the two x16 connectors provided on the riser device 214 using the x4 connectors "1", "2", "3", and "4", and the x4 connectors "5", "6", "7", and '8"), and include device subsystems 600a and 602a, respectively, that are coupled to the riser device 214. For example, and as discussed in further detail below, the coupling between the device subsystems 600a and 602a provided on the devices 600 and 602 and the riser device 214 may be configurable (as indicated by the dashed line provided for those couplings in FIG. 6A.) However, while a specific example is described, one of skill in the art in possession of the present disclosure will recognize that other device subsystems having other configurable connection capabilities will fall within the scope of the present disclosure as well. As discussed in further detail below, the couplings between the control/bridge subsystem 212, the riser device 214, and the device subsystems 600a and 602a provide one or more hardware subsystems that include a plurality of communication couplings that may couple each of the plurality of device subsystems 600a and 602a to at least one of the plurality of processing subsystems 206a and 208a in order to provide a respective subset of available communication resources in the server device 200 to each of the plurality of processing subsystems 206a and 208*a*. Furthermore, in the illustrated embodiment, the BMC device 216 is coupled to each of the device subsystems 600*a* and 602*a*.

In the example illustrated and described below with reference to FIGS. 7A-7G, a pair of multi-endpoint adapter devices 700 and 702 are coupled to the riser device 214 (e.g., via the two x16 connectors provided on the riser device 214 using the x4 connectors "1", "2", "3", and "4", and the x4 connectors "5", "6", "7", and '8"), and include a plurality of endpoints that are coupled to the riser device 214. For example, and as discussed in further detail below, the coupling between the endpoints provided on the multi-endpoint adapter devices 700 and 702 and the riser device 214 may be configurable (as indicated by the dashed line provided for those couplings in FIG. 7A.) In a specific example, the endpoint provided on the multi-endpoint adapter devices 700 and 702 may be provided by physical or virtual Peripheral Component Interconnect express (PCIe) endpoints such as, for example, the Network Interface Controllers (NICs) 700*a* and 702*a* on the multi-endpoint adapter devices 700 and 702, illustrated in FIG. 7A. As discussed in further detail below, the couplings between the control/bridge subsystem 212, the riser device 214, and the NICs 700*a* and 702*a* provide one or more hardware subsystems that include a plurality of communication couplings that may couple each of the plurality of endpoints (e.g., the NICs 700*a* and 702*a*) to at least one of the plurality of processing subsystems 206*a*, 208*a*, 300*a*, and 302*a* in order to provide a respective subset of available communication resources in the server device 200 to each of the plurality of processing subsystems 206*a*, 208*a*, 300*a*, and 302*a*.

In a specific example, the NICs 700*a* and 702*a* provide "multi-PCIe-endpoint devices" that are configured to allow for the splitting of the resources of that NIC between multiple processing subsystems. For example, and as discussed below, each of the NICs 700*a* and 702*a* may be configured to split their respective x16 connection to the riser device 214 into two x8 connections to a pair of processing subsystems, or four x4 connections to each of four processing subsystems. However, while a specific example is described, one of skill in the art in possession of the present disclosure will recognize that other endpoints having other configurable connection capabilities will fall within the scope of the present disclosure as well. Furthermore, in the illustrated embodiment, the BMC device 216 is coupled to each of the NICs 700*a* and 702*a*.

In the example illustrated and described below with reference to FIGS. 8A-8E, a pair of multi-endpoint adapter devices 800 and 802 are coupled to the riser device 214 (e.g., via the two x16 connectors provided on the riser device 214 using the x4 connectors "1", "2", "3", and "4", and the x4 connectors "5", "6", "7", and '8"), and include a plurality of endpoints that are coupled to the riser device 214. For example, and as discussed in further detail below, the coupling between the endpoints provided on the multi-endpoint adapter devices 800 and 802 and the riser device 214 may be configurable (as indicated by the dashed line provided for those couplings in FIG. 8A.) In a specific example, the endpoint provided on the multi-endpoint adapter devices 800 and 802 may be provided by physical or virtual Peripheral Component Interconnect express (PCIe) endpoints such as, for example, the Network Interface Controllers (NICs) 800*a* and 802*a* on the multi-endpoint adapter devices 800 and 802, illustrated in FIG. 8A. As discussed in further detail below, the couplings between the control/bridge subsystem 212, the riser device 214, and the NICs 800*a* and 802*a* provide one or more hardware subsystems that include a plurality of communication couplings that may couple each of the plurality of endpoints (e.g., the NICs 800*a* and 802*a*) to at least one of the plurality of processing subsystems 206*a*, 208*a*, 300*a*, and 302*a* in order to provide a respective subset of available communication resources in the server device 200 to each of the plurality of processing subsystems 206*a*, 208*a*, 300*a*, and 302*a*.

In a specific example, the NICs 800*a* and 802*a* provide "multi-PCIe-endpoint devices" that are configured to allow for the splitting of the resources of that NIC between multiple processing subsystems. For example, and as discussed below, each of the NICs 800*a* and 802*a* may be configured to split their respective x16 connection to the riser device 214 into two x8 connections to a pair of processing subsystems, or four x4 connections to each of four processing subsystems. However, while a specific example is described, one of skill in the art in possession of the present disclosure will recognize that other endpoints having other configurable connection capabilities will fall within the scope of the present disclosure as well. Furthermore, in the illustrated embodiment, the BMC device 216 is coupled to each of the NICs 800*a* and 802*a*.

In the example illustrated and described below with reference to FIGS. 9A-9E, a multi-endpoint adapter device 900 is coupled to the riser device 214 (e.g., via one of the x16 connectors provided on the riser device 214 using the x4 connectors "1", "2", "3", and "4"), and includes a plurality of endpoints that are coupled to the riser device 214. For example, and as discussed in further detail below, the coupling between the endpoints provided on the multi-endpoint adapter device 900 and the riser device 214 may be configurable (as indicated by the dashed line provided for those couplings in FIG. 9A.) In a specific example, the endpoint provided on the multi-endpoint adapter device 900 may be provided by physical or virtual Peripheral Component Interconnect express (PCIe) endpoints such as, for example, the Network Interface Controller (NIC) 900*a* on the multi-endpoint adapter device 900, illustrated in FIG. 9A. As discussed in further detail below, the couplings between the control/bridge subsystem 212, the riser device 214, and the NIC 900*a* provide one or more hardware subsystems that include a plurality of communication couplings that may couple each of the plurality of endpoints (e.g., the NIC 900*a*) to at least one of the plurality of processing subsystems 206*a*, 208*a*, 300*a*, and 302*a* in order to provide a respective subset of available communication resources in the server device 200 to each of the plurality of processing subsystems 206*a*, 208*a*, 300*a*, and 302*a*.

Figure 9A:
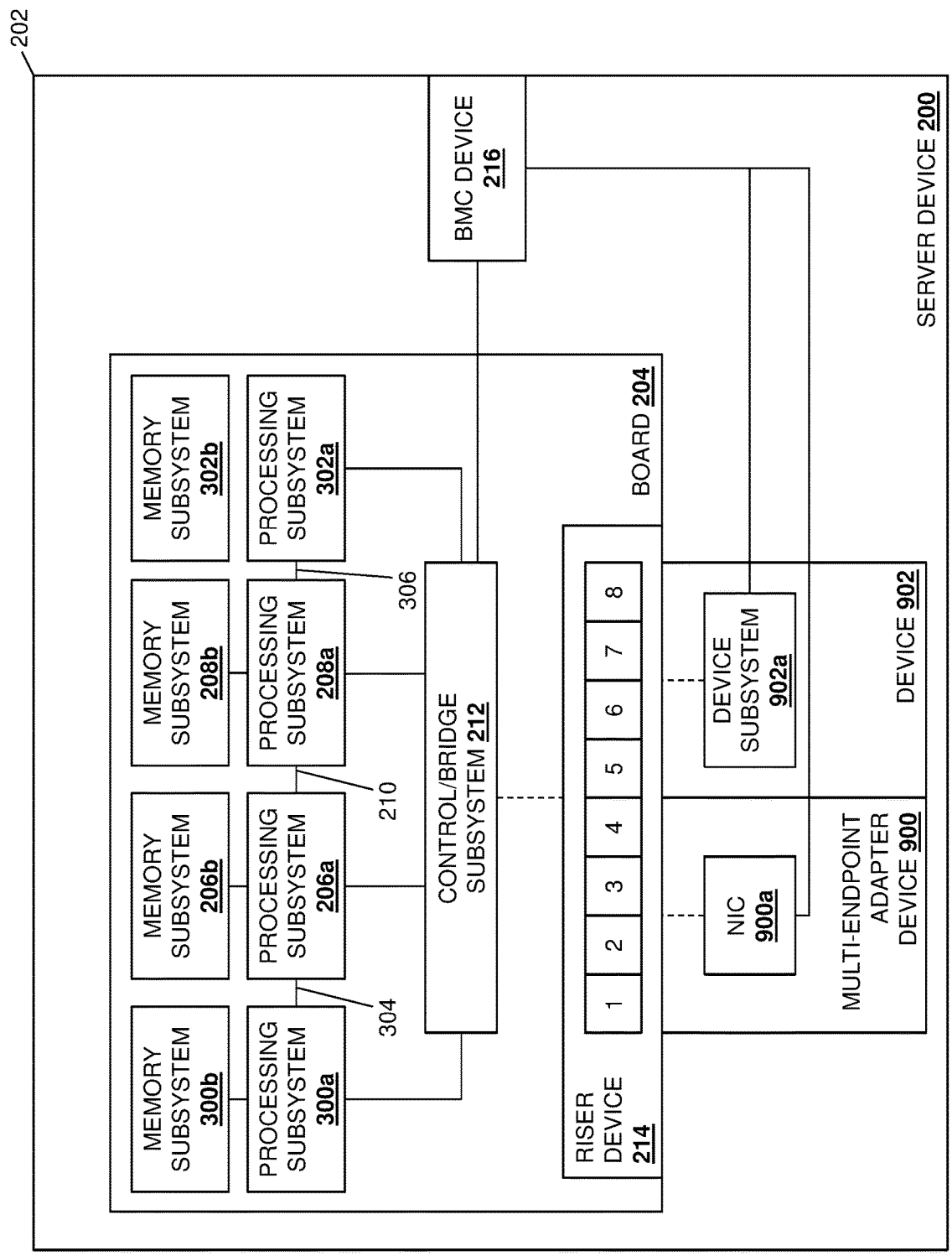
FIG. 9A is a schematic view illustrating an embodiment of processor/endpoint communication coupling configuration system in the server device of FIG. 3 during the method of FIG. 4.
Figure 9B:
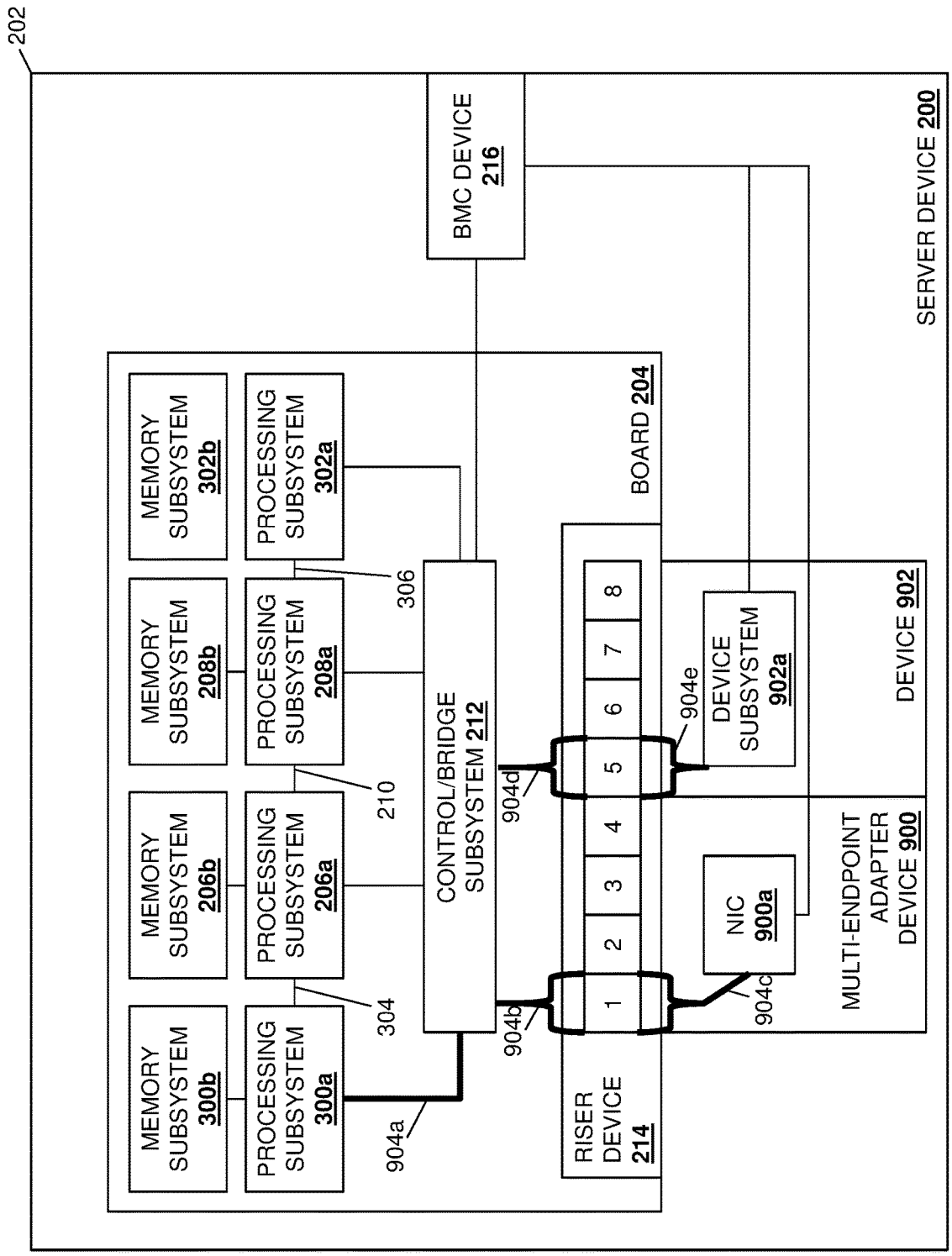
FIG. 9B is a schematic view illustrating an embodiment of processor/endpoint communication coupling configuration system in the server device of FIG. 3 configuring communication couplings during the method of FIG. 4.

In a specific example, the NIC 900*a* provides a "multi-PCIe-endpoint device" that is configured to allow for the splitting of the resources of that NIC between multiple processing subsystems. For example, and as discussed below, the NIC 900*a* may be configured to split its respective x16 connection to the riser device 214 into two x8 connections to a pair of processing subsystems, or four x4 connections to each of four processing subsystems. However, while a specific example is described, one of skill in the art in possession of the present disclosure will recognize that other endpoints having other configurable connection capabilities will fall within the scope of the present disclosure as well. FIG. 9A also illustrates how another device 902 (e.g., a non-multi-endpoint adapter device) may be coupled to the riser device 214 and may provide a device subsystem 902*a* that is coupled to the riser device 214. By a configurable connection as well (as indicated by the dashed line provided for those couplings in FIG. 9A.) Furthermore, in the illustrated embodiment, the BMC device 216 is coupled to each of the NIC 900a and the device subsystem 902a.

The method 400 begins at block 402 where hardware subsystem(s) are identified that include communication couplings that couple processing subsystems to multi-endpoint adapter device(s). In an embodiment, at block 402, the communication coupling configuration engine provided by the BMC device 216 operates to identify hardware subsystems that include communication couplings that couple processing subsystems to multi-endpoint adapter device(s). In a specific example, the BMC device 216 may boot before the server device 200 is powered on or otherwise initialized, and may operate to perform inventory operations to identify any or all of the hardware subsystems in the server device 200. As such, at block 402, the communication coupling configuration engine in the BMC device 216 may identify host Central Processing Unit (CPU) presence, port availability, motherboard-CPU-to-riser/connector(s), and/or other hardware subsystems that would be apparent to one of skill in the art in possession of the present disclosure. With reference to the examples provided in FIGS. 5A and 6A, at block 402 the communication coupling configuration engine in the BMC device 216 may identify the memory subsystems 206a and 208b, the processing subsystems 206a and 208a, the UPI 210 between the processing subsystems 206a and 208a, the control bridge subsystem 212, the couplings between the processing subsystems 206a/208a and the control bridge subsystem 212, the riser device 214, and the couplings between the control bridge subsystem 212 and the riser device 214.

Figure 7A:
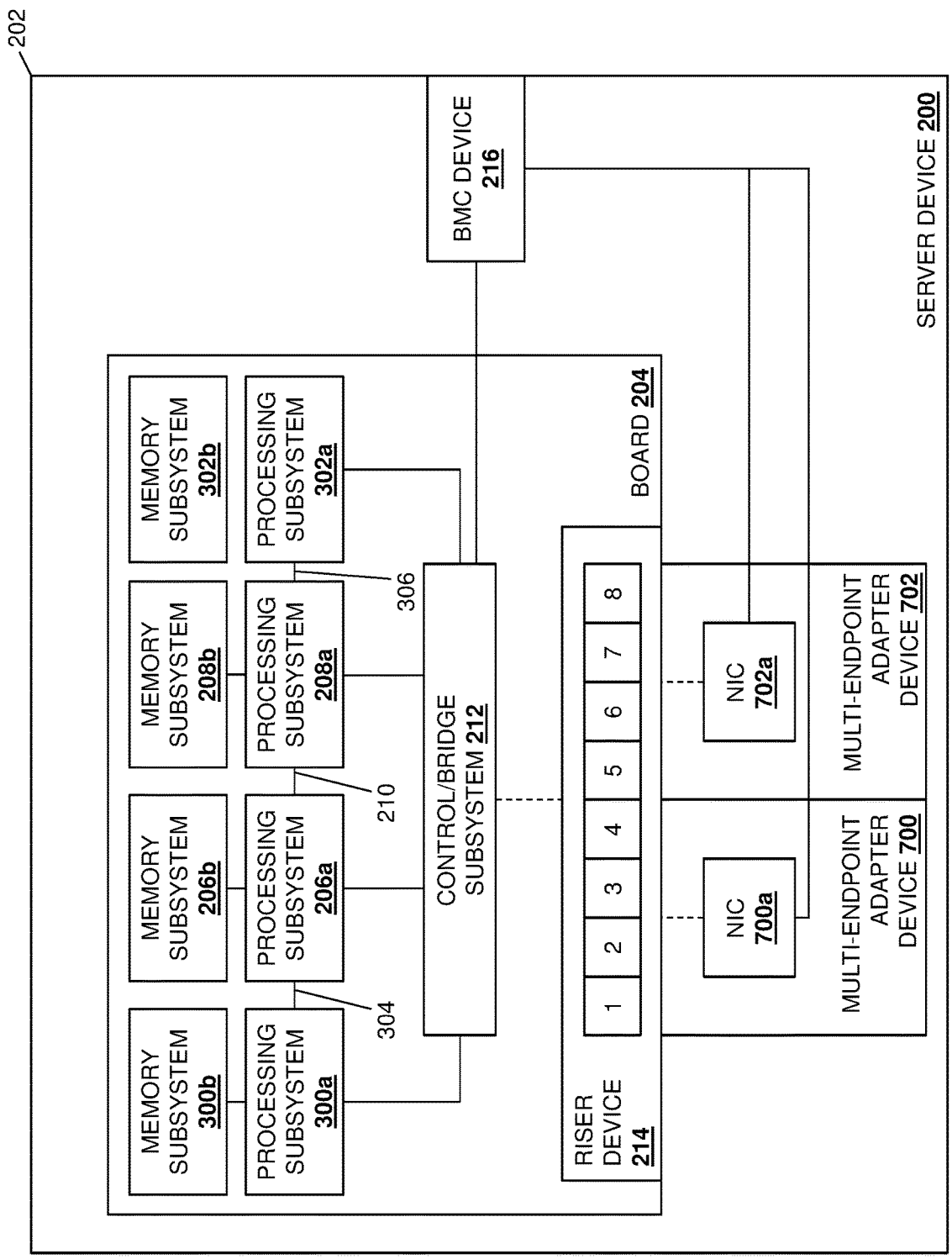
FIG. 7A is a schematic view illustrating an embodiment of processor/endpoint communication coupling configuration system in the server device of FIG. 3 during the method of FIG. 4.
Figure 7B:
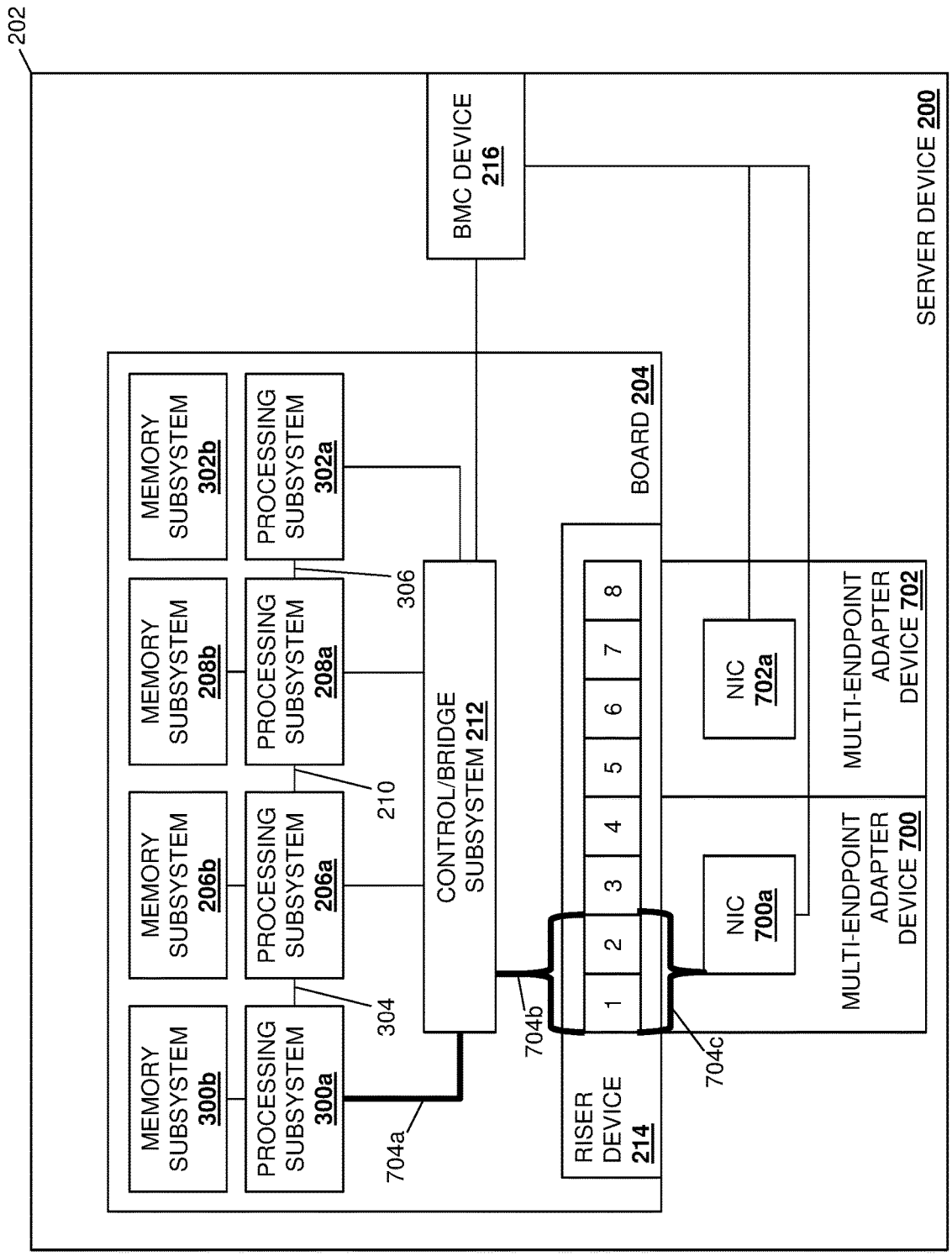
FIG. 7B is a schematic view illustrating an embodiment of processor/endpoint communication coupling configuration system in the server device of FIG. 3 configuring communication couplings during the method of FIG. 4.
Figure 8A:
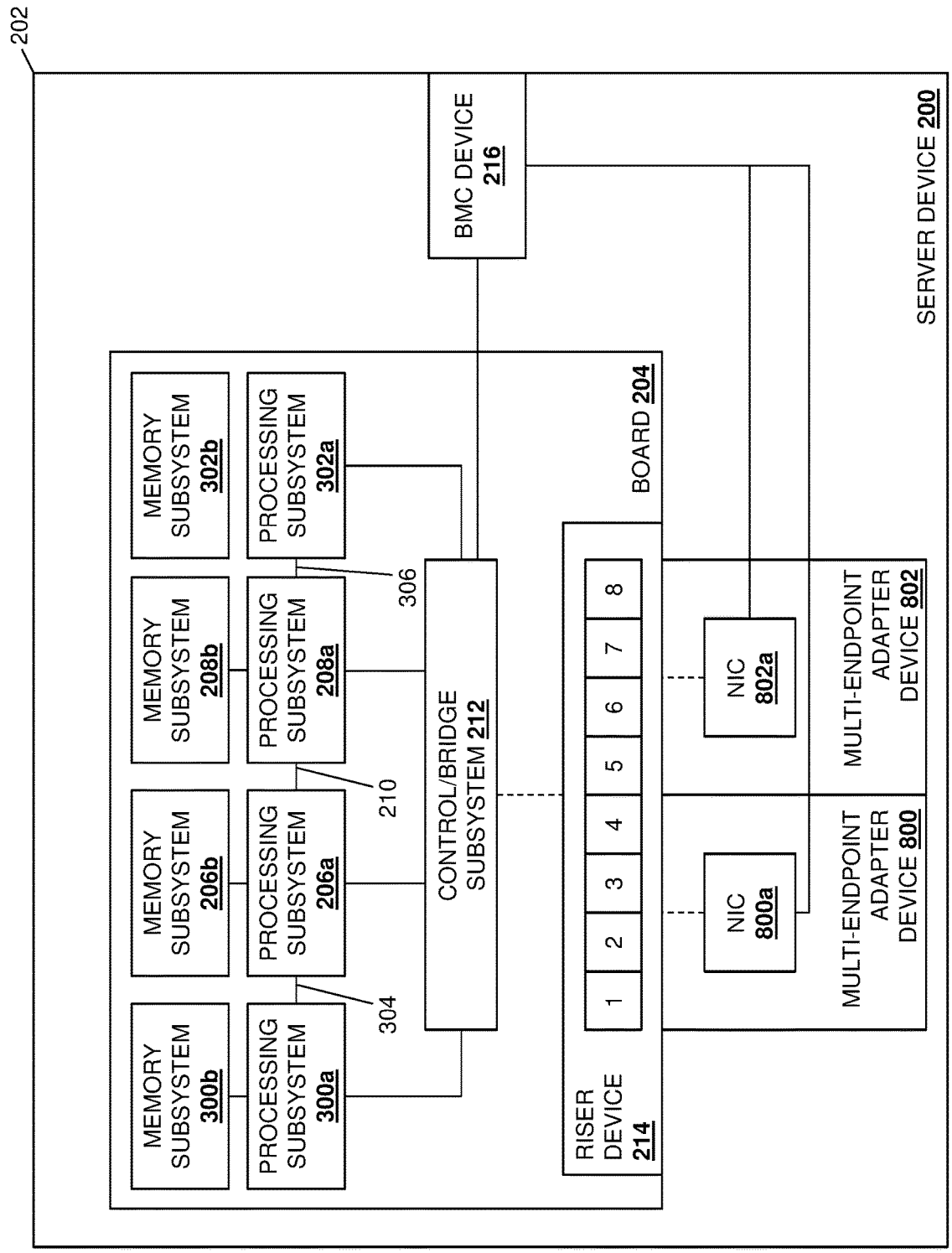
FIG. 8A is a schematic view illustrating an embodiment of processor/endpoint communication coupling configuration system in the server device of FIG. 3 during the method of FIG. 4.
Figure 8B:
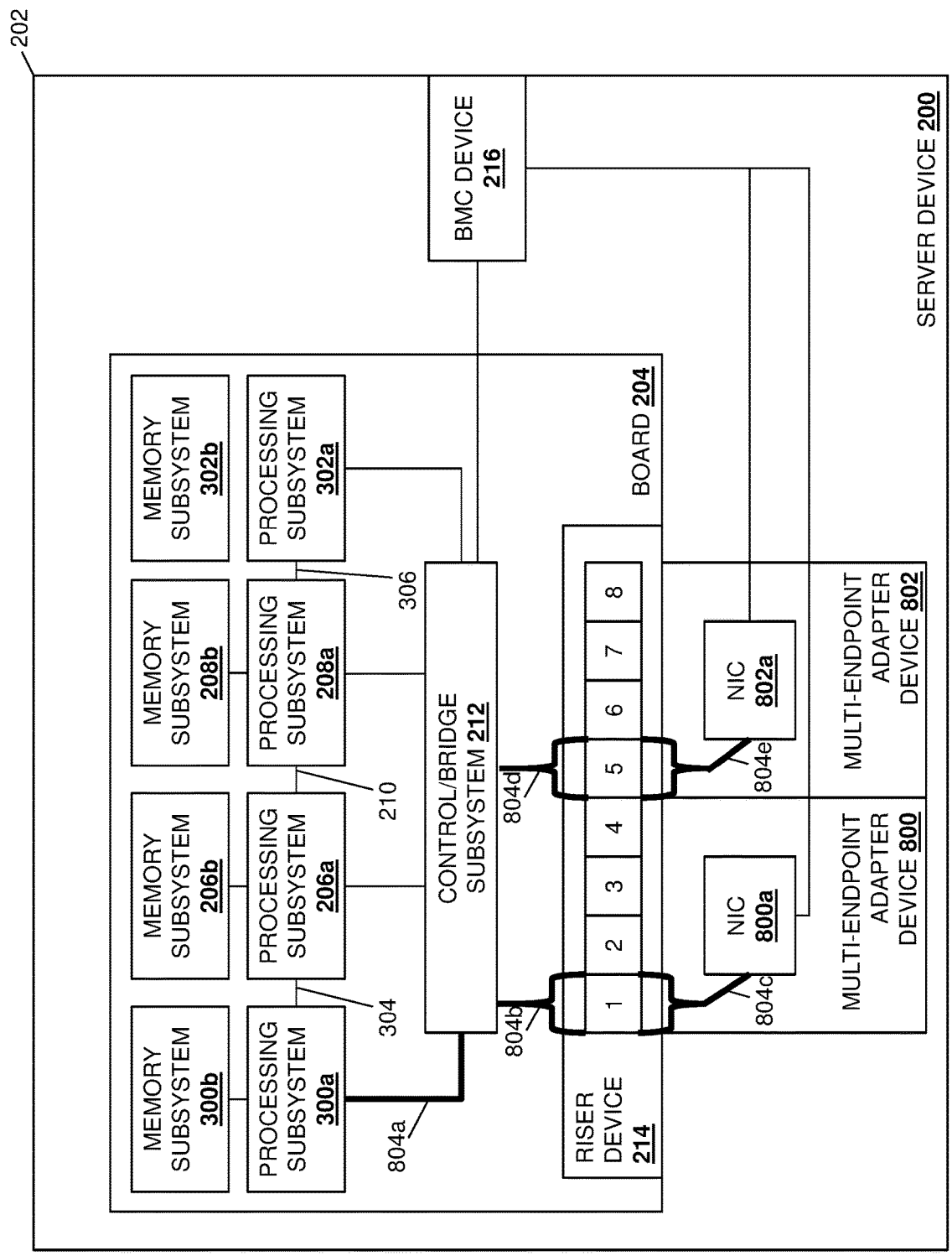
FIG. 8B is a schematic view illustrating an embodiment of processor/endpoint communication coupling configuration system in the server device of FIG. 3 configuring communication couplings during the method of FIG. 4.

Similarly, with reference to the examples provided in FIGS. 7A, 8A, and 9A, at block 402 the communication coupling configuration engine in the BMC device 216 may identify the memory subsystems 206a, 208b, 300b, and 302b, the processing subsystems 206a, 208a, 300a, and 302a, the UPI 210 between the processing subsystems 206a and 208a, the UPI 304 between the processing subsystems 300a and 206a, the UPI 306 between the processing subsystems 208a and 302a, the control bridge subsystem 212, the couplings between the processing subsystems 206a/208a/300a/302a and the control bridge subsystem 212, the riser device 214, and the couplings between the control bridge subsystem 212 and the riser device 214. However, while specific examples have been described, one of skill in the art in possession of the present disclosure will recognize how a BMC device may perform inventory operations in order to identify any hardware subsystems that provide communication couplings between processing subsystems and endpoints while remaining within the scope of the present disclosure as well.

The method 400 then proceeds to block 404 where a communication coupling configuration capability of the communication couplings is determined. In an embodiment, at block 404, the communication coupling configuration engine provided by the BMC device 216 operates to determine communication coupling configuration capabilities for the communication couplings that couple the processing subsystems to multi-endpoint adapter device(s). As discussed above, in a specific example, the BMC device 216 may boot before the server device is powered on or otherwise initialized, and may operate to perform inventory operations to determine communication coupling configuration capabilities for the communication couplings included in the hardware subsystems identified at block 402. As such, at block 402, the communication coupling configuration engine in the BMC device 216 may determine installed riser types, trace configurations, cabling configurations (e.g., slimline PCIe cabling configurations), and/or other communication coupling configuration information that would be apparent to one of skill in the art in possession of the present disclosure. As such, with reference to the examples provided in FIGS. 5A and 6A, at block 402 the communication coupling configuration engine in the BMC device 216 may determine the configuration capabilities of the couplings between the processing subsystems 206a/208a and the control bridge subsystem 212, the couplings between the control bridge subsystem 212 and the riser device 214, and the riser device 214.

Similarly, with reference to the examples provided in FIGS. 7A, 8A, and 9A, at block 402 the communication coupling configuration engine in the BMC device 216 may determine the configuration capabilities of the couplings between the processing subsystems 206a/208a/300a/302a and the control bridge subsystem 212, and the couplings between the control bridge subsystem 212 and the riser device 214, and the riser device 214. However, while specific examples have been described, one of skill in the art in possession of the present disclosure will recognize how a BMC device may perform inventory operations in order to determine configuration capabilities of a variety of communication couplings between processing subsystems and endpoints while remaining within the scope of the present disclosure as well.

The method 400 then proceeds to block 406 where a multi-endpoint adapter device capabilit(ies) are determined. In an embodiment, at block 406, the communication coupling configuration engine provided by the BMC device 216 operates to determine capabilities of any multi-endpoint adapter device(s) provided in the server device 200. As discussed above, in a specific example, the BMC device 216 may boot before the server device is powered on or otherwise initialized, and may operate to perform inventory operations to determine multi-endpoint adapter device capabilities for multi-endpoint adapter device(s) coupled to the riser device 214. As such, at block 406, the communication coupling configuration engine in the BMC device 216 may perform read operations on an Electronically Erasable Programmable Read-Only Memory (EEPROM) subsystem in any multi-endpoint adapter device to which it is connected in order to determine the capabilities of that multi-endpoint adapter, which may include determining an endpoint type, endpoint capabilities, endpoint communication coupling configurations (e.g., configurations of communication couplings between the endpoint and the riser device 214), configuration capabilities of the endpoint communication couplings, and/or other multi-endpoint adapter device information that would be apparent to one of skill in the art in possession of the present disclosure. As such, with reference to the example provided in FIG. 5A, at block 406 the communication coupling configuration engine in the BMC device 216 may determine the capabilities of the multi-endpoint adapter device 500, and may determine that the device 502 is not a multi-endpoint adapter device.

Figure 6A:
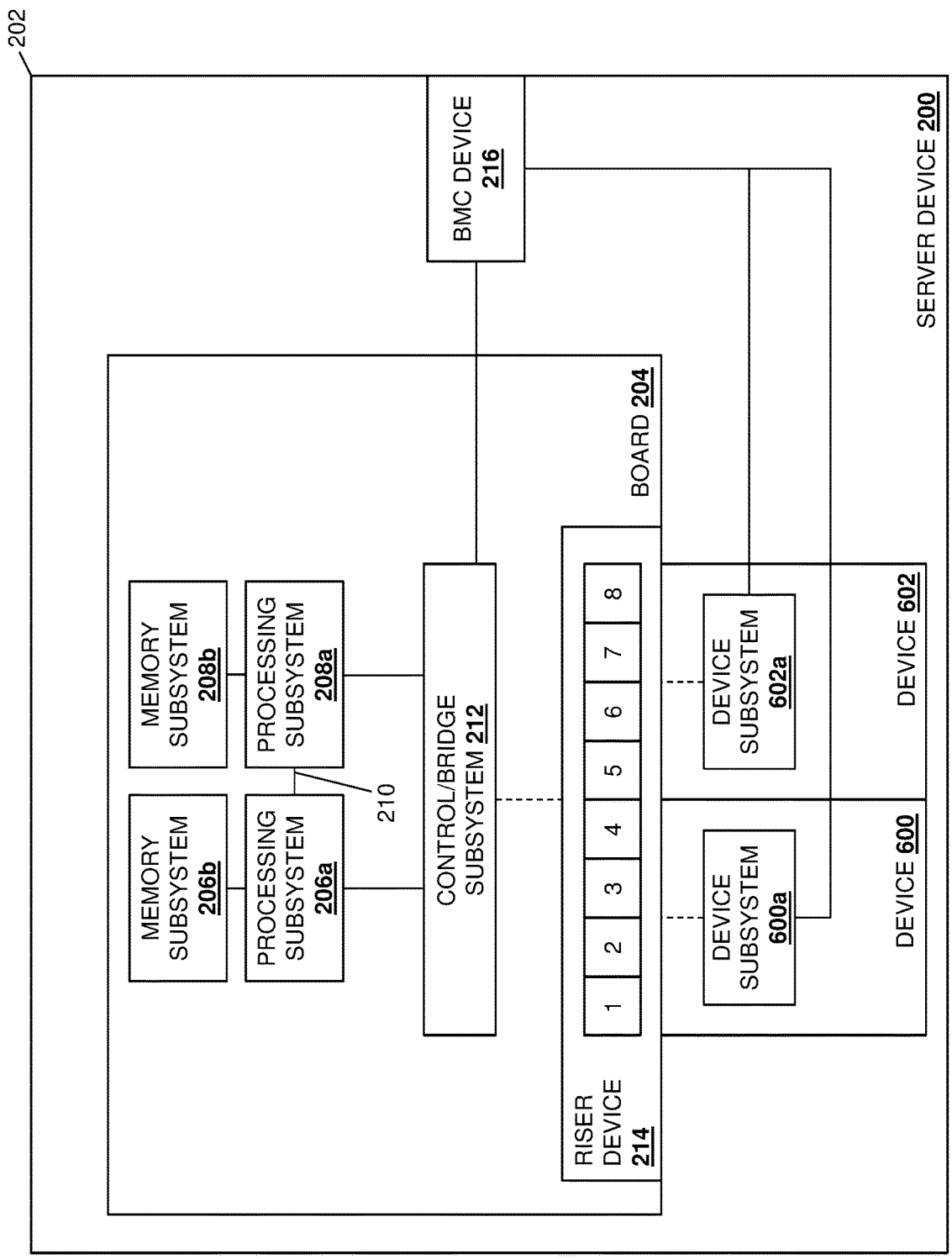
FIG. 6A is a schematic view illustrating an embodiment of processor/endpoint communication coupling configuration system in the server device of FIG. 2 during the method of FIG. 4.

Similarly, with reference to the example provided in FIG. 6A, at block 406 the communication coupling configuration engine in the BMC device 216 may determine that the devices 600 and 602 are not multi-endpoint adapter devices. Similarly, with reference to the example provided in FIG. 7A, at block 406 the communication coupling configuration engine in the BMC device 216 may determine the capabilities of the multi-endpoint adapter devices 700 and 702. Similarly, with reference to the example provided in FIG. 8A, at block 406 the communication coupling configuration engine in the BMC device 216 may determine the capabilities of the multi-endpoint adapter devices 800 and 902. Similarly, with reference to the example provided in FIG. 9A, at block 406 the communication coupling configuration engine in the BMC device 216 may determine the capabilities of the multi-endpoint adapter device 900, and may determine that the device 902 is not a multi-endpoint adapter device. However, while specific examples have been described, one of skill in the art in possession of the present disclosure will recognize how a BMC device may perform inventory operations in order to determine a variety of capabilities of multi-endpoint adapter devices included in the server device while remaining within the scope of the present disclosure as well.

The method 400 may then proceed to optional block 408 where a user configuration policy may be retrieved. In an embodiment, at optional block 408, the communication coupling configuration engine provided by the BMC device 216 may operate to retrieve a user configuration policy. For example, an administrator or other user of the server device 200 may be given an option to define a user configuration policy (e.g., via an F2 menu selection provided during the boot of the server device 200, via out-of-band methods known in the art, etc.) that details a desired operation of the server device 200, the multi-endpoint adapter device(s) provided in the server device 200, the resources that are to be allocated to applications provided by the processing subsystems in the server device 200, and/or any other user configuration policy information that would be apparent to one of skill in the art in possession of the present disclosure.

The method 400 then proceeds to block 410 where configuration information is generated. In an embodiment, at block 410, the communication coupling configuration engine provided by the BMC device 216 may operate to determine and generate configuration information based on at least one of the hardware subsystems identified at block 402, the configuration capabilities of the communication couplings that were determined at block 404, the capabilities of the multi-endpoint adapter device that were determined at block 406 and, in some embodiments, the user configuration policy that was retrieved at optional block 408. For example, in embodiments in which the user configuration policy is not retrieved, the communication coupling configuration engine provided by the BMC device 216 may operate to determine a "best fit" configuration for the communication couplings that is based on at least one of the hardware subsystems identified at block 402, the configuration capabilities of the communication couplings that were determined at block 404, and the capabilities of the multi-endpoint adapter device that were determined at block 406. However, in embodiments in which the user configuration policy is retrieved, the communication coupling configuration engine provided by the BMC device 216 may operate to determine a "best fit" configuration for the communication couplings that is based on at least one of the hardware subsystems identified at block 402, the configuration capabilities of the communication couplings that were determined at block 404, the capabilities of the multi-endpoint adapter device that were determined at block 406, and that user configuration policy. In either situation, the communication coupling configuration engine provided by the BMC device 216 may have learned the hardware subsystems and I/O topologies in the server device 200, and created a mapping of the hardware subsystems to the processing subsystems and endpoint links. As will be understood by one of skill in the art in possession of the present disclosure, the discovery by the BMC device 216 of the configuration capabilities of a source and destination may be modified by a user if necessary.

As would be understood by one of skill in the art in possession of the present disclosure, the configuration information generated at block 410 may be any information that provides for the configuration of the communication couplings in the examples discussed below. As such, the configuration information generated at block 410 may include any information that provides for the particular communication resource allocations discussed in the examples below, as well as any other communication resource allocations that would be apparent to one of skill in the art in possession of the present disclosure.

Furthermore, in some embodiments, the at least some of the configuration information may be transmitted by the communication coupling configuration engine provided by the BMC device 216 to the control/bridge subsystem 212 and multi-endpoint adapter device(s) included in the server device 200 in order to, for example, provide for the configuration of the control/bridge subsystem 212 and those multi-endpoint adapter devices in a manner that corresponds with the configuration of the communication couplings in order to allocate communication resources via those configurations. For example, at block 410, the communication coupling configuration engine provided by the BMC device 216 may operate to provide flex Input/Output (I/O) configuration information to the multi-endpoint adapter device(s) provided in the server device 200 via a sideband interface (e.g., an Inter-Integrated Circuit ($I^2C$) sideband interface). In such examples, the flex I/O configuration information may be configured to cause an adapter device I/O expander in the multi-endpoint adapter device to convert an endpoint (e.g., a NIC in the examples below) from operating as a single endpoint (e.g., a single NIC) that utilizes a x16 connection to the riser device 214, to operating as two endpoints (e.g., two NICs) that each utilize a x8 connection to the riser device 214. However, while a specific example is provided, one of skill in the art in possession of the present disclosure will recognize that a variety of configuration information may be provided to a multi-endpoint adapter device to provide for a variety of configurations that will fall within the scope of the present disclosure as well.

The method 400 may then proceed to optional block 412 where boot operations may be initiated. In an embodiment, at optional block 412, the communication coupling configuration engine provided by the BMC device 216 may operate to initiate boot operations for the server device 200. As discussed above, in some specific examples the BMC device 216 may boot before the server device 200 is powered on or otherwise initialized, and may then operate to perform blocks 402, 404, 406, optional block 408, and block 410 of the method 400, followed by optional block 412 where a boot of the server device 200 is initiated to allow for the configuration discussed below with regard to block 414. However, in other embodiments, the operations of the BMC device 216 and its communication coupling configuration engine (or other communication coupling configuration subsystem provided as discussed above) may occur during runtime operations for the server device 200, and thus optional block 412 may be skipped and the configuration discussed below with regard to block 414 may be performed during those server device runtime operations as well. However, in embodiments in which the server device 200 performs the reboot operations at optional block 412, the server device 200 may power on and, in response, perform a Power On Self Test (POST).

The method 400 then proceeds to block 414 where communication couplings are configured to provide at least one communication resource between at least one processing subsystem on the board and at least one on endpoint on the multi-endpoint adapter device(s). In an embodiment, at block 414, the communication coupling configuration engine provided by the BMC device 216 may operate to provide flex I/O configuration information to a Basic Input/Output System (BIOS) in the server device 200, which may be configured to allow the BIOS to perform CPU link purposing that may include fabric operations, birfurcation operations, and/or other CPU link purposing that would be apparent to one of skill in the art in possession of the present disclosure. Furthermore, any endpoints provided on multi-endpoint adapter devices in the server device 200 may be released from reset and may perform link training, and the adapter device I/O expander in the multi-endpoint adapter device may read requested I/O expander signal states to configure its endpoints and bifurcations accordingly. As will be appreciated by one of skill in the art in possession of the present disclosure, when the endpoints are PCIe endpoints that are part of a single chip package, there may be a single set of PHY pins, and bus exchange switching may be performed either at an analog pre-SERDES level, or post-PHY at a digital level. While a specific example has been provided, one of skill in the art in possession of the present disclosure will recognize that the BMC device 216 may communicate with the BIOS in the server device 200 in a variety of manners to control endpoint signals so that intended topologies and memory fabric types are set up for proper boot and runtime use. Some example configurations will now be discussed with reference to the figures, but one of skill in the art in possession of the present disclosure will recognize that any of a variety of configurations may be enabled via the teachings of the present disclosure as well.

Figure 5B:
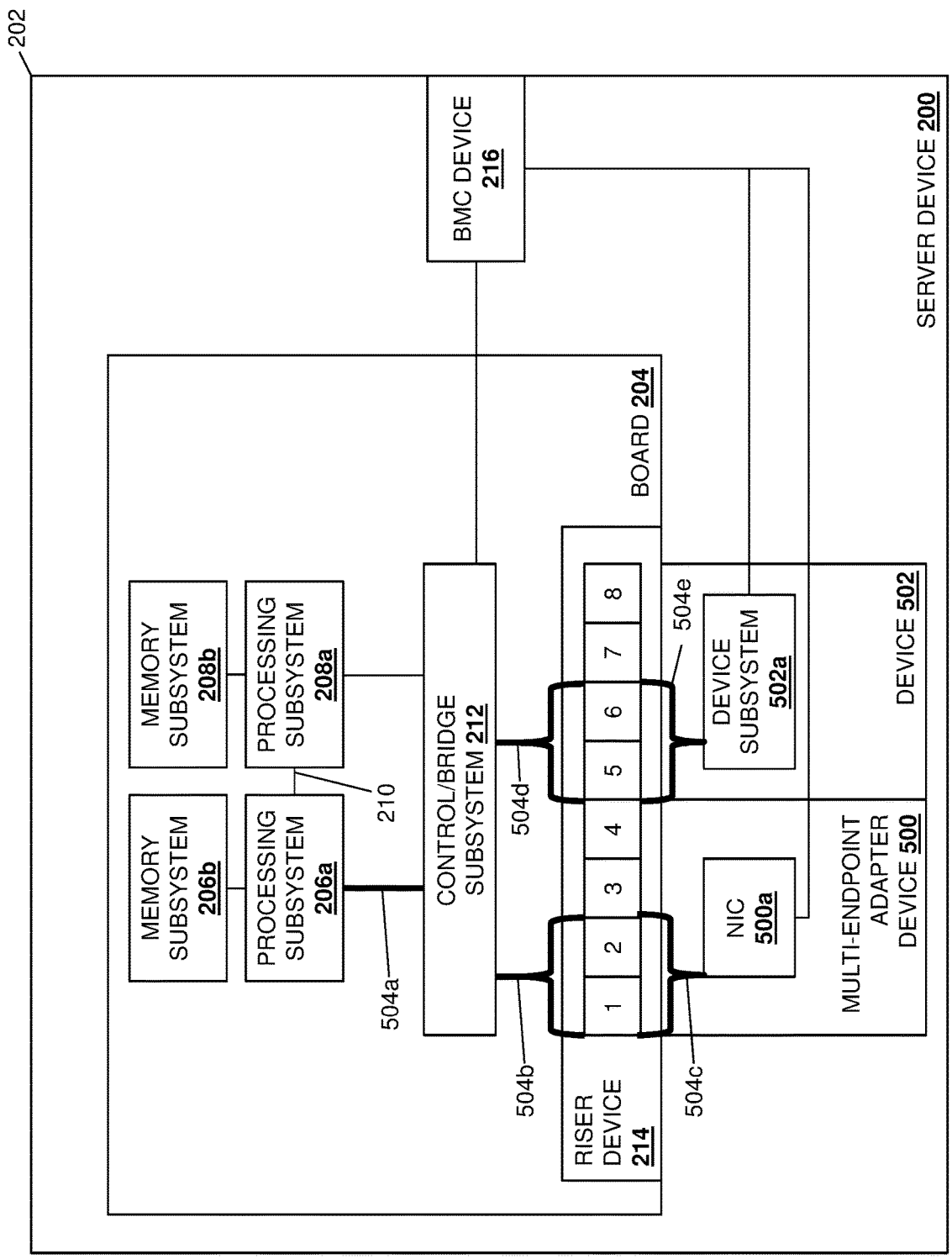
FIG. 5B is a schematic view illustrating an embodiment of processor/endpoint communication coupling configuration system in the server device of FIG. 2 configuring communication couplings during the method of FIG. 4.
Figure 5C:
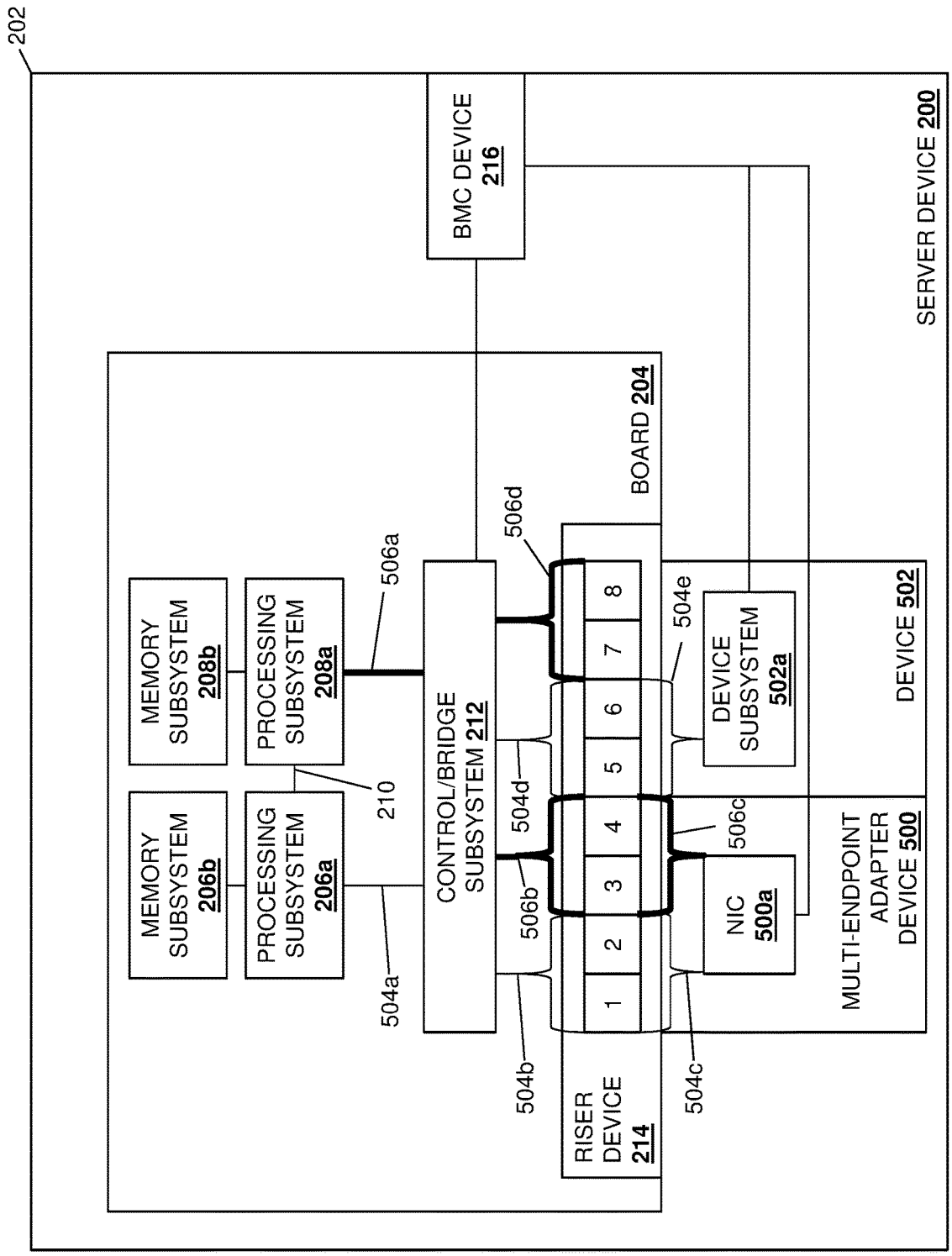
FIG. 5C is a schematic view illustrating an embodiment of processor/endpoint communication coupling configuration system in the server device of FIG. 2 configuring communication couplings during the method of FIG. 4.

With reference to example illustrated in FIGS. 5A, 5B, and 5C, FIG. 5B illustrates how the communication coupling configuration engine provided by the BMC device 216 may provide communication resources in the server device 200 to the processing subsystem 206a by configuring (or providing for the configuration of) communication couplings 504a, 504b, and 504c in order to couple the processing subsystem 206a to the NIC 500a via a x8 connection (provided by x4 connectors "1" and "2" on the riser device 214), as well as communication couplings 504a, 504d, and 504e in order to couple the processing subsystem 206a to the device subsystem 502a via a x8 connection (provided by x4 connectors "5" and "6" on the riser device 214). FIG. 5C illustrates how the communication coupling configuration engine provided by the BMC device 216 may provide communication resources in the server device 200 to the processing subsystem 208a by configuring (or providing for the configuration of) communication couplings 506a, 506b, and 506c in order to couple the processing subsystem 208a to the NIC 500a via a x8 connection (provided by x4 connectors "3" and "4" on the riser device 214), as well as communication couplings 506a and 506d in order to provide access to the multiple endpoints (e.g., the NIC 500a and the device subsystem 502a) by the processing subsystem 208a. For example, such a configuration may avoid the need for a switch (e.g., a PCIe switch) on the adapter device(s) 500 and 502 to enable the utilization of the available endpoints (which may manifest to the operating system as multiple PCIe devices, device drivers, and respective stacks) while providing logical system setup advantages (e.g., for assigning specific endpoints to specific virtual machines). As such, the example in FIGS. 5A, 5B, and 5C illustrates how each processing subsystem 206a and 206b may be allocated communication resources (a x8 communication coupling in this example) to the NIC 500a on the multi-endpoint adapter device 500, while the device subsystem 502a may be allocated communication resources (a x8 communication coupling in this example) to a single processing subsystem 206a.

Figure 6B:
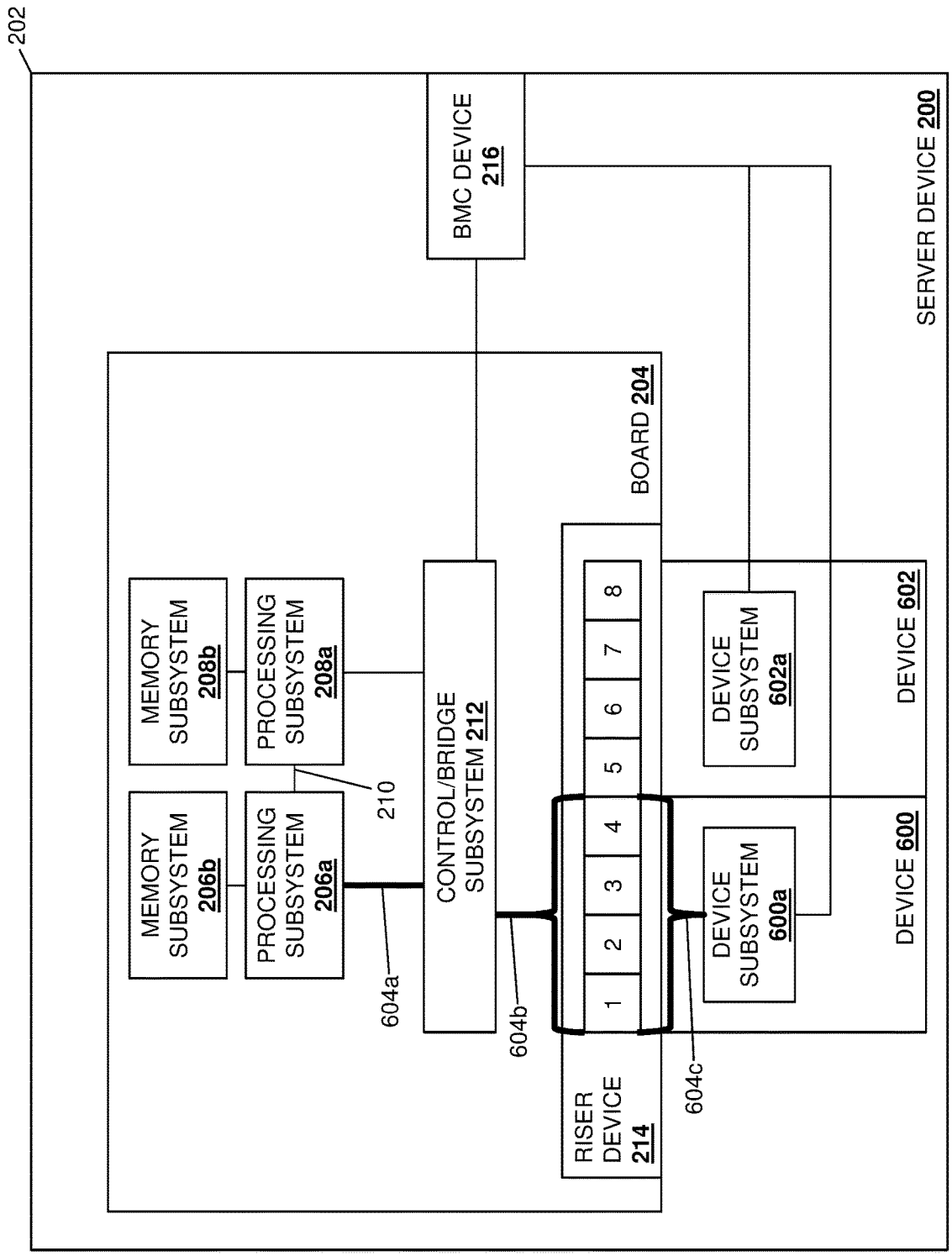
FIG. 6B is a schematic view illustrating an embodiment of processor/endpoint communication coupling configuration system in the server device of FIG. 2 configuring communication couplings during the method of FIG. 4.
Figure 6C:
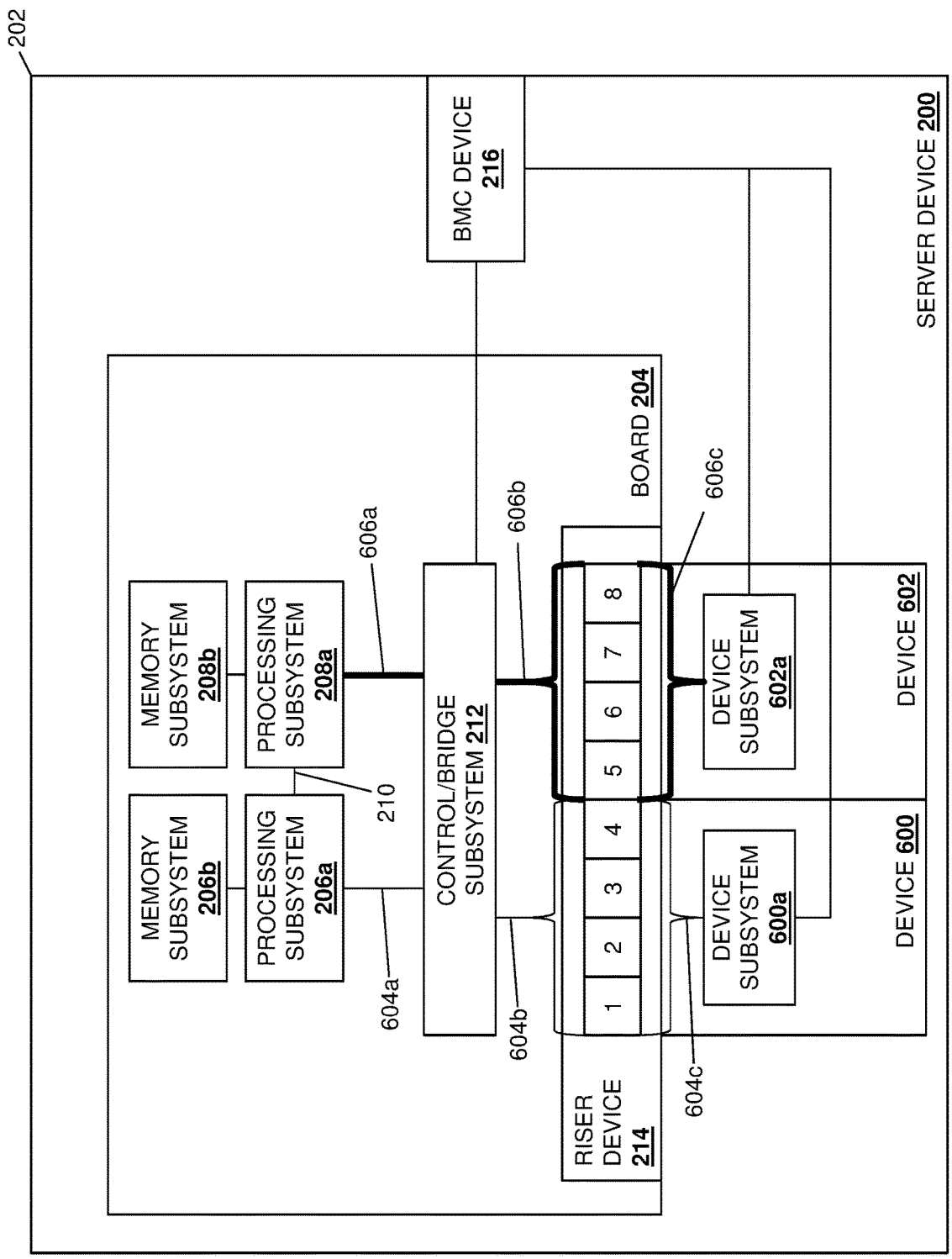
FIG. 6C is a schematic view illustrating an embodiment of processor/endpoint communication coupling configuration system in the server device of FIG. 2 configuring communication couplings during the method of FIG. 4.

With reference to example illustrated in FIGS. 6A, 6B, and 6C, FIG. 6B illustrates how the communication coupling configuration engine provided by the BMC device 216 may provide communication resources in the server device 200 to the processing subsystem 206a by configuring (or providing for the configuration of) communication couplings 604a, 604b, and 604c in order to couple the processing subsystem 206a to the device subsystem 600a via a x16 connection (provided by x4 connectors "1", "2", "3", and "4" on the riser device 214). FIG. 6C illustrates how the communication coupling configuration engine provided by the BMC device 216 may provide communication resources in the server device 200 to the processing subsystem 208a by configuring (or providing for the configuration of) communication couplings 606a, 606b, and 606c in order to couple the processing subsystem 208a to the device subsystem 602a via a x16 connection (provided by x4 connectors "5", "6", "7", and "8" on the riser device 214). As such, the example in FIGS. 6A, 6B, and 6C illustrate how each processing subsystem 206a and 208a may be allocated communication resources (a x16 communication coupling in this example) to respective device subsystems 600a and 602a on devices 600 and 602. For example, when non-multi-endpoint adapter devices are connected to the riser device 214, the communication coupling configuration engine provided by the BMC device 216 may recognize that and provide a maximum bandwidth connection (e.g., x16 in this example) between each processing subsystems and a respective one of the non-multi-endpoint adapter devices.

Figure 7C:
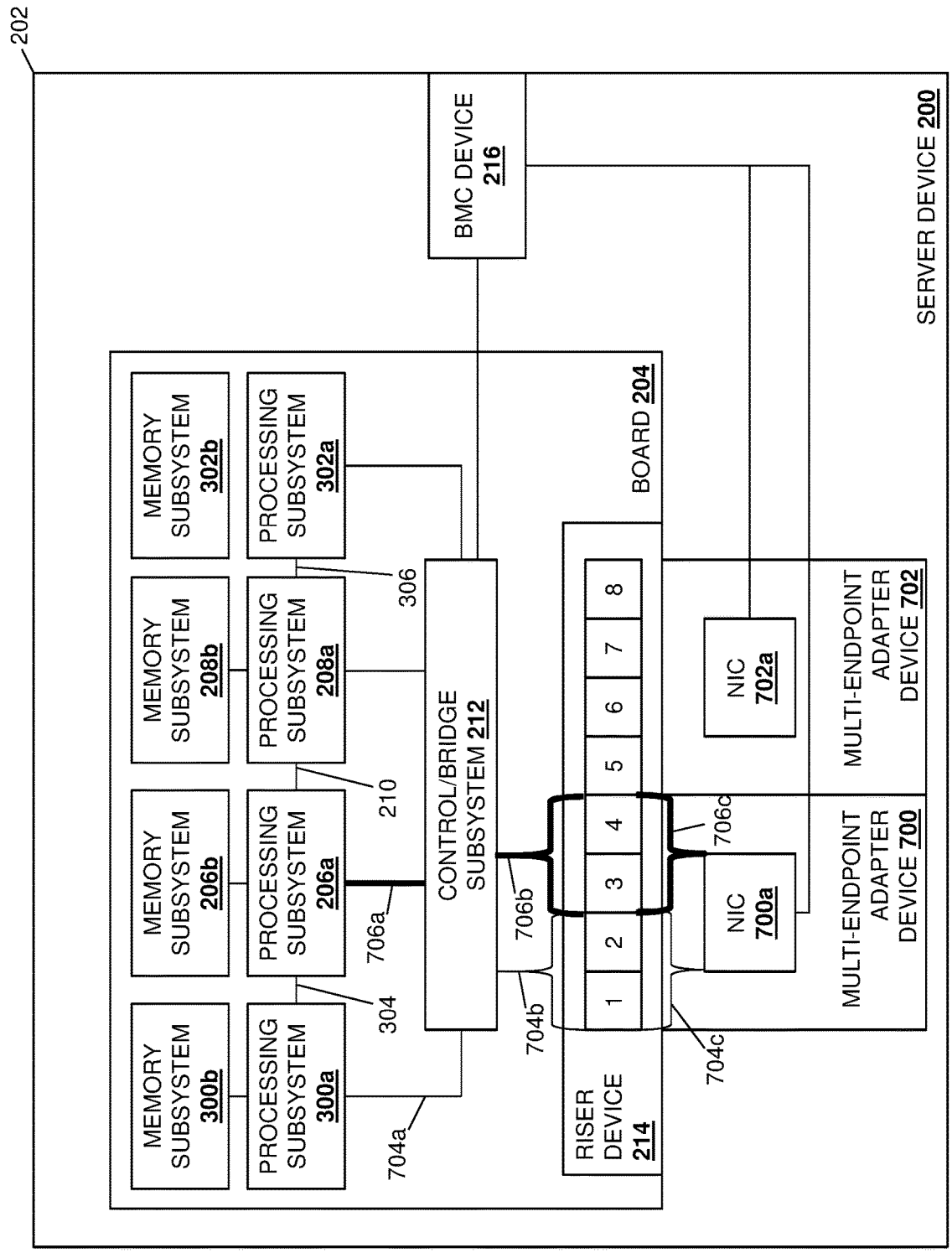
FIG. 7C is a schematic view illustrating an embodiment of processor/endpoint communication coupling configuration system in the server device of FIG. 3 configuring communication couplings during the method of FIG. 4.

With reference to example illustrated in FIGS. 7A, 7B, 7C, 7D, and 7E, FIG. 7B illustrates how the communication coupling configuration engine provided by the BMC device 216 may provide communication resources in the server device 200 to the processing subsystem 300a by configuring (or providing for the configuration of) communication couplings 704a, 704b, and 704c in order to couple the processing subsystem 300a to the NIC 700a via a x8 connection (provided by x4 connectors "1" and "2" on the riser device 214). FIG. 7C illustrates how the communication coupling configuration engine provided by the BMC device 216 may provide communication resources in the server device 200 to the processing subsystem 206a by configuring (or providing for the configuration of) communication couplings 706a, 706b, and 706c in order to couple the processing subsystem 206a to the NIC 700a via a x8 connection (provided by x4 connectors "3" and "4" on the riser device 214).

Figure 7D:
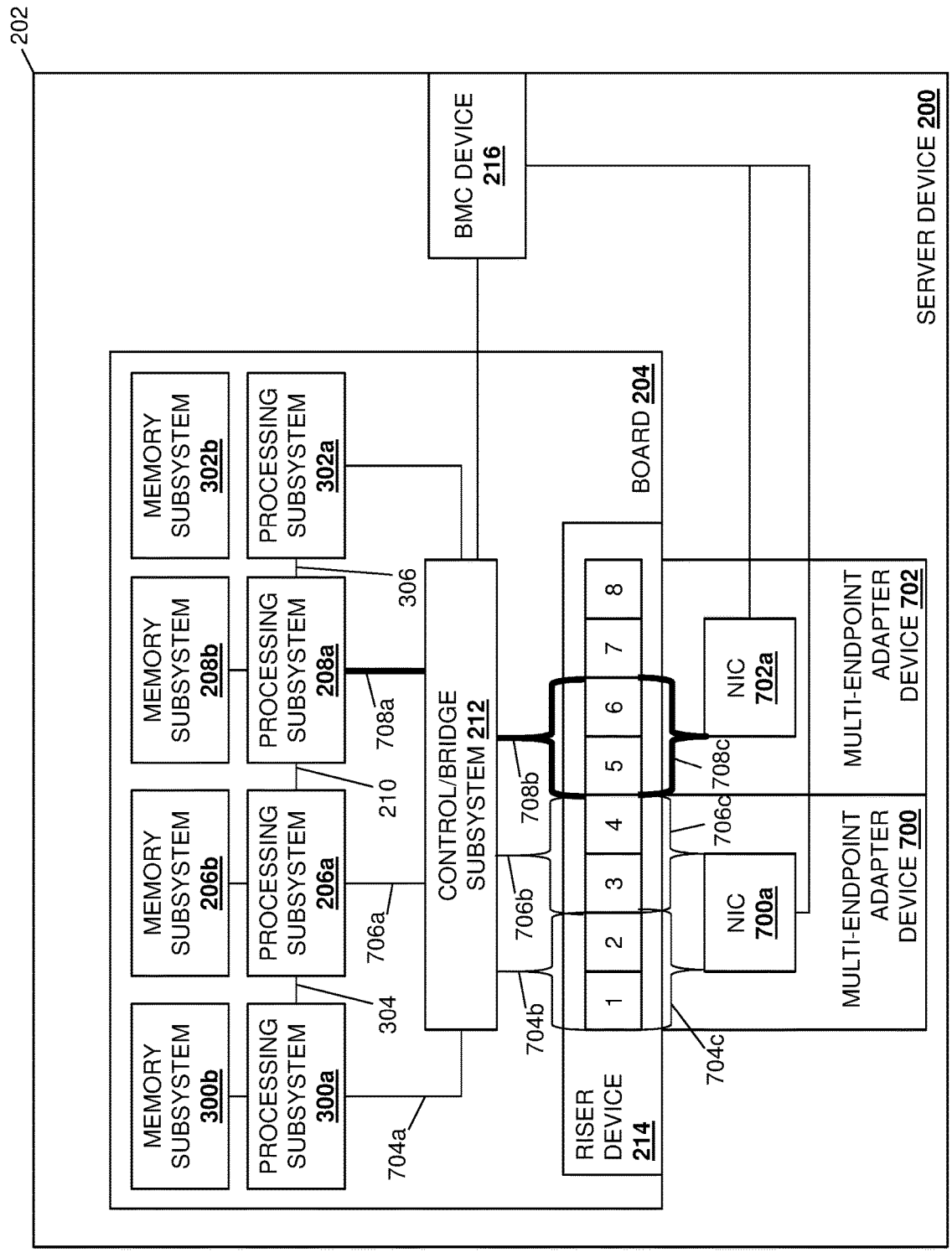
FIG. 7D is a schematic view illustrating an embodiment of processor/endpoint communication coupling configuration system in the server device of FIG. 3 configuring communication couplings during the method of FIG. 4.
Figure 7E:
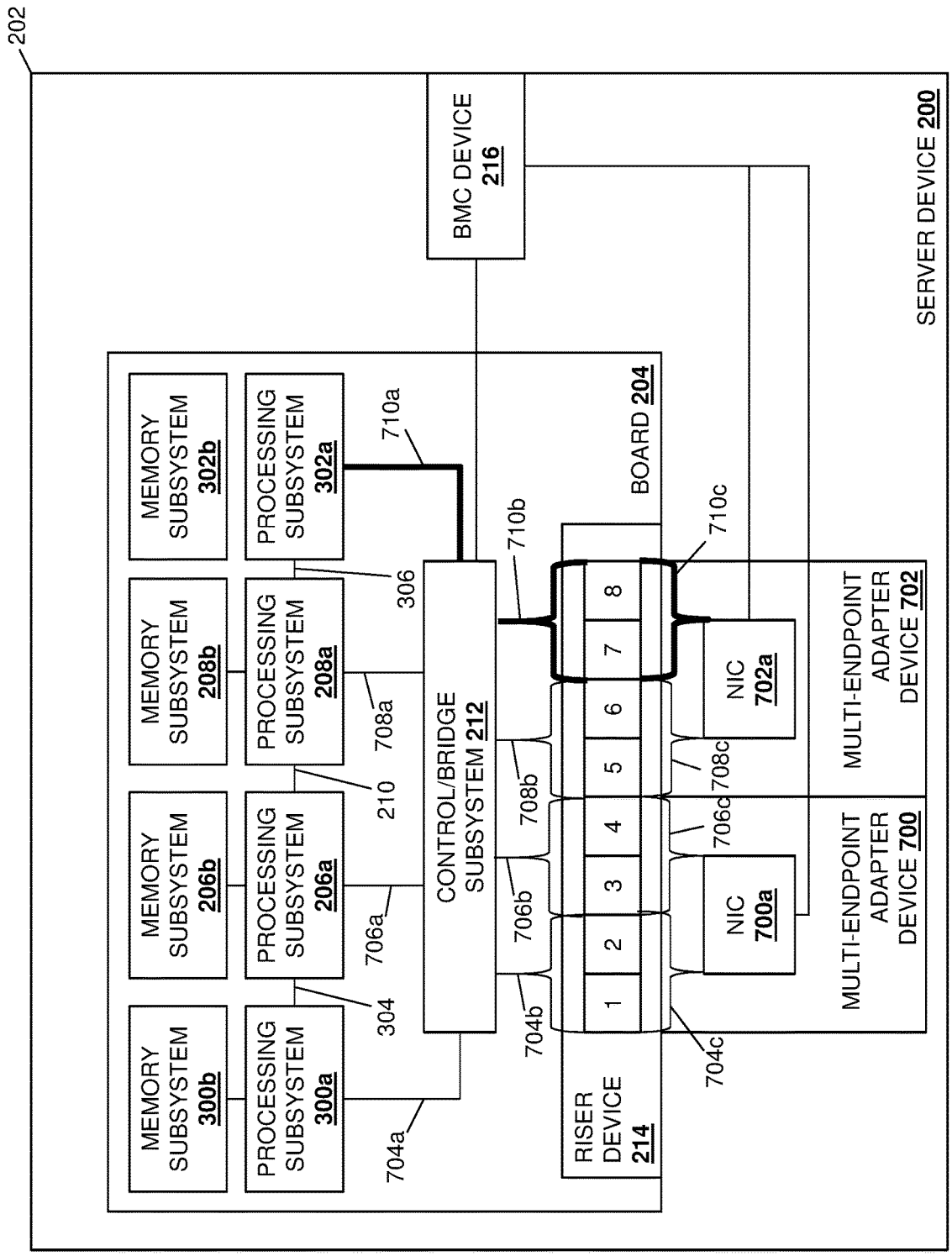
FIG. 7E is a schematic view illustrating an embodiment of processor/endpoint communication coupling configuration system in the server device of FIG. 3 configuring communication couplings during the method of FIG. 4.

FIG. 7D illustrates how the communication coupling configuration engine provided by the BMC device 216 may provide communication resources in the server device 200 to the processing subsystem 208a by configuring (or providing for the configuration of) communication couplings 708a, 708b, and 708c in order to couple the processing subsystem 208a to the NIC 702a via a x8 connection (provided by x4 connectors "5" and "6" on the riser device 214). FIG. 7E illustrates how the communication coupling configuration engine provided by the BMC device 216 may provide communication resources in the server device 200 to the processing subsystem 302a by configuring (or providing for the configuration of) communication couplings 710a, 710b, and 710c in order to couple the processing subsystem 302a to the NIC 702a via a x8 connection (provided by x4 connectors "7" and "8" on the riser device 214). As such, the example in FIGS. 7A, 7B, 7C, 7D, and 7E illustrate how each processing subsystem 206a and 300a may be allocated communication resources (a respective x8 communication coupling in this example) to one of the NICs 700a, while each processing subsystem 208a and 302a may be allocated communication resources (a respective x8 communication coupling in this example) to the other of the NICs 702a. For example, when multiple multi-endpoint adapter devices are connected to the riser device 214, communication resources may be evenly split (e.g., a x8 connection for each processing subsystem in this example) to ensure each processing subsystem has direct I/O access, rather than having to traverse a UPI 210, 304, or 306.

Figure 7F:
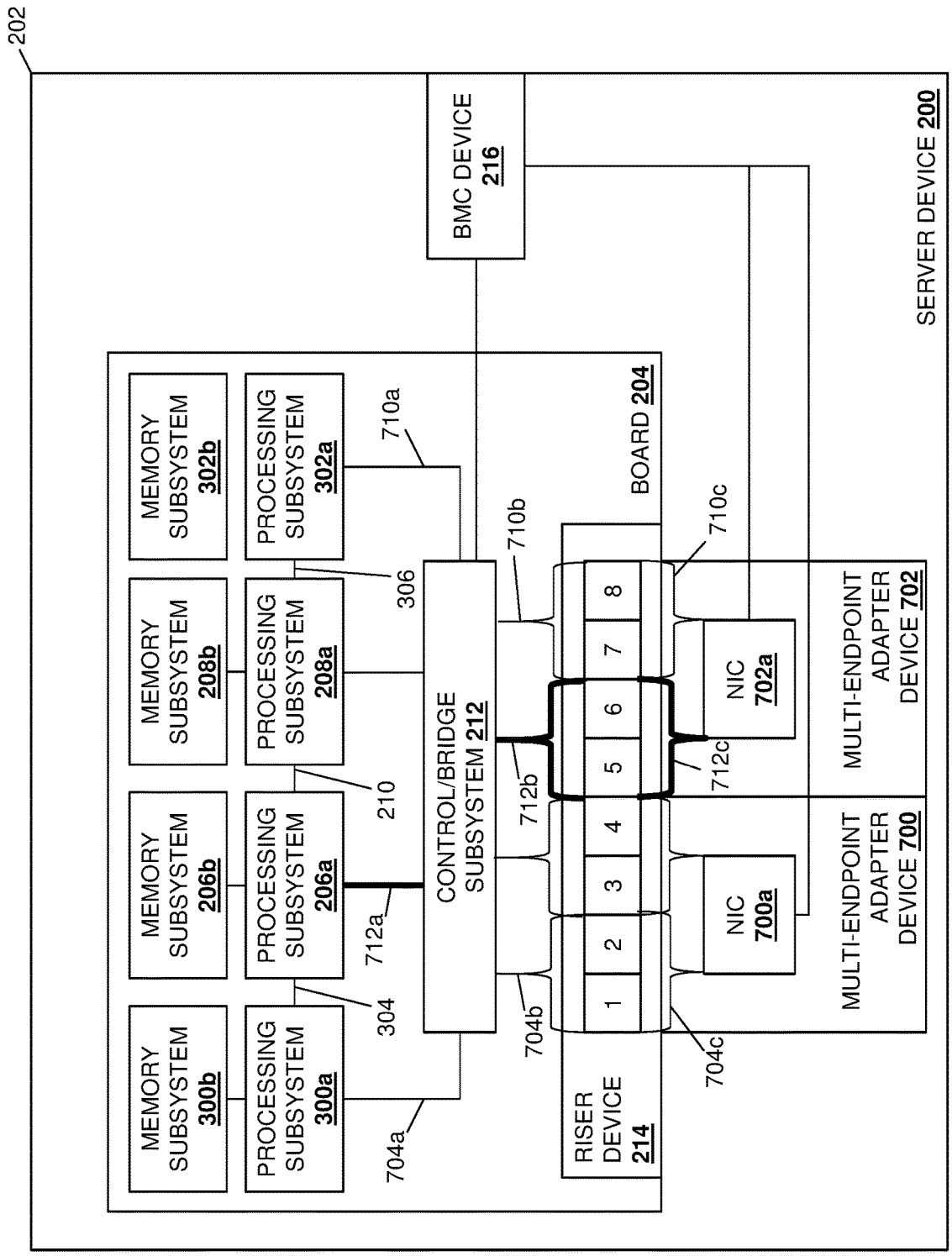
FIG. 7F is a schematic view illustrating an embodiment of processor/endpoint communication coupling configuration system in the server device of FIG. 3 configuring communication couplings during the method of FIG. 4.
Figure 7G:
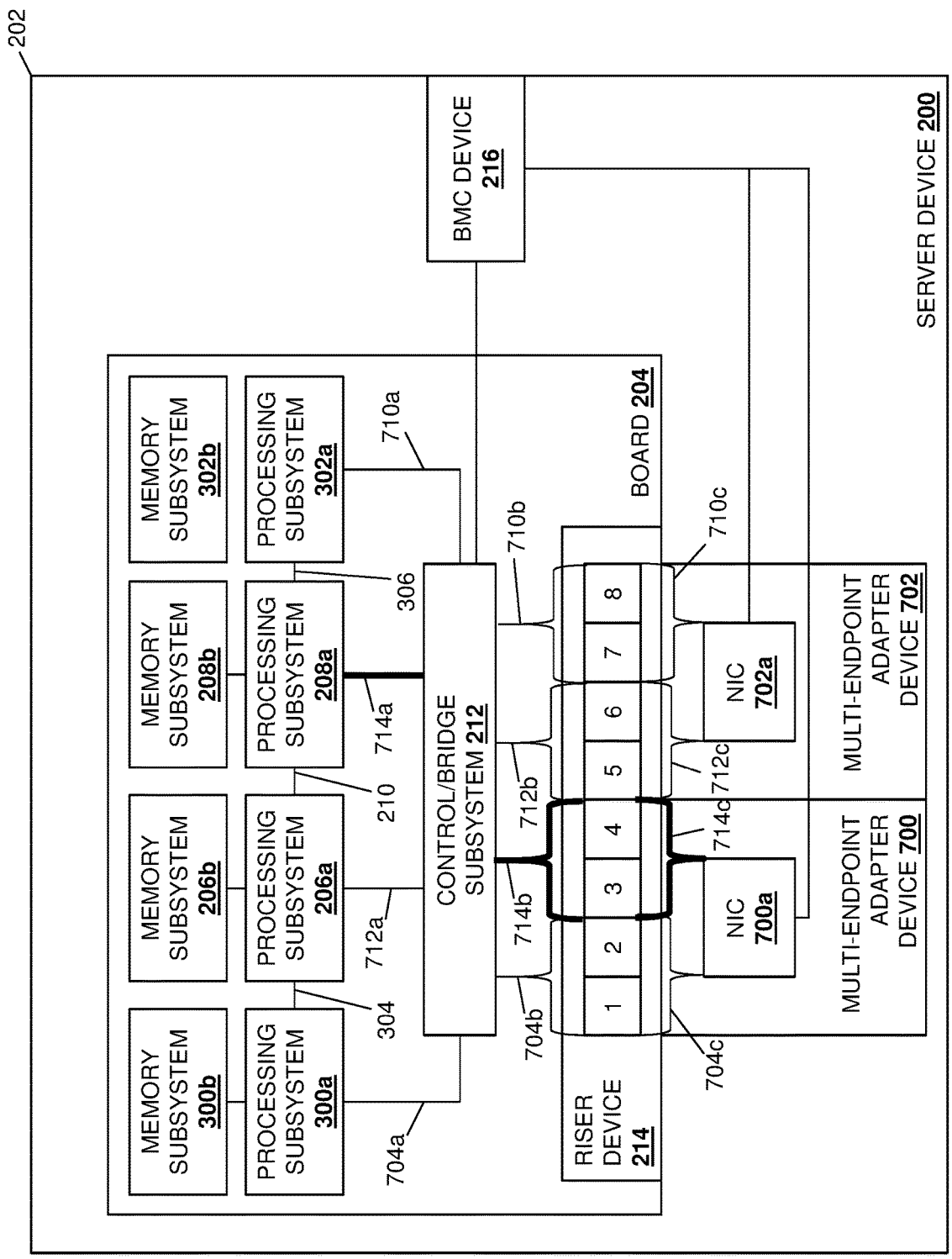
FIG. 7G is a schematic view illustrating an embodiment of processor/endpoint communication coupling configuration system in the server device of FIG. 3 configuring communication couplings during the method of FIG. 4.

Continuing with the example discussed above with reference to FIGS. 7A, 7B, 7C, 7D, and 7E, and with reference to FIGS. 7F and 7G, the control/bridge subsystem 212 and the communication coupling configuration engine provided by the BMC device 216 may be configured to understand data traffic patterns and provide for Quality of Service (QoS) functions, which may be accomplished via user preference settings, automated traffic pattern adjustments, and/or using a variety of other techniques that would be apparent to one of skill in the art in possession of the present disclosure. For example, FIGS. 7F and 7G illustrate how the control/bridge subsystem 212 and/or the communication coupling configuration engine provided by the BMC device 216 may reallocate communication resources in the server device 200 to the processing subsystem 206a by configuring (or providing for the configuration of) communication couplings 712a, 712b, and 712c in order to couple the processing subsystem 206a to the NIC 702a via a x8 connection (provided by x4 connectors "5" and "6" on the riser device 214), and how the control/bridge subsystem 212 and/or the communication coupling configuration engine provided by the BMC device 216 may reallocate communication resources in the server device 200 to the processing subsystem 208a by configuring (or providing for the configuration of) communication couplings 714a, 714b, and 714c in order to couple the processing subsystem 208a to the NIC 700a via a x8 connection (provided by x4 connectors "3" and "4" on the riser device 214). As such, communication resources (e.g., the x8 connections in this example) provided between particular sets of processing subsystems and endpoints can be swapped in order to satisfy QoS considerations. Similarly, in another embodiment, a x16 connection could be provided between a particular processing subsystem and respective endpoint in the example provided in FIGS. 7A-7G, while x4 connections could be provided between the remaining processing subsystems and their respective endpoints, in order to satisfy QoS considerations as well.

Figure 8C:
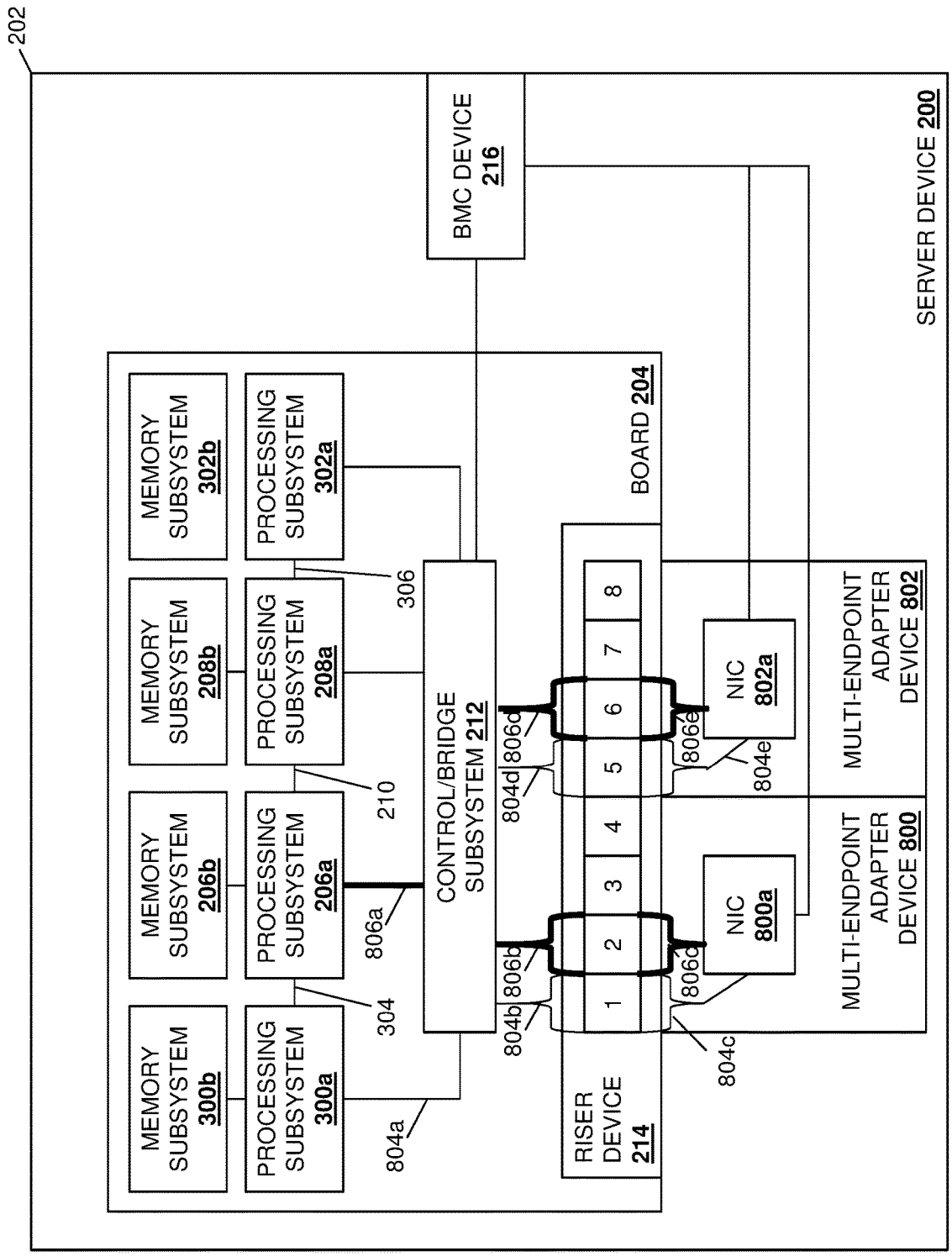
FIG. 8C is a schematic view illustrating an embodiment of processor/endpoint communication coupling configuration system in the server device of FIG. 3 configuring communication couplings during the method of FIG. 4.

With reference to example illustrated in FIGS. 8A, 8B, 8C, 8D, and 8E, FIG. 8B illustrates how the communication coupling configuration engine provided by the BMC device 216 may provide communication resources in the server device 200 to the processing subsystem 300a by configuring (or providing for the configuration of) communication couplings 804a, 804b, and 804c in order to couple the processing subsystem 300a to the NIC 800a via a x4 connection (provided by x4 connector "1" the riser device 214), and by configuring (or providing for the configuration of) communication couplings 804a, 804d, and 804e in order to couple the processing subsystem 300a to the NIC 802a via a x4 connection (provided by x4 connector "5" the riser device 214). FIG. 8C illustrates how the communication coupling configuration engine provided by the BMC device 216 may provide communication resources in the server device 200 to the processing subsystem 206a by configuring (or providing for the configuration of) communication couplings 806a, 806b, and 806c in order to couple the processing subsystem 206aa to the NIC 800a via a x4 connection (provided by x4 connector "2" the riser device 214), and by configuring (or providing for the configuration of) communication couplings 806a, 806d, and 806e in order to couple the processing subsystem 206a to the NIC 802a via a x4 connection (provided by x4 connector "6" the riser device 214).

Figure 8D:
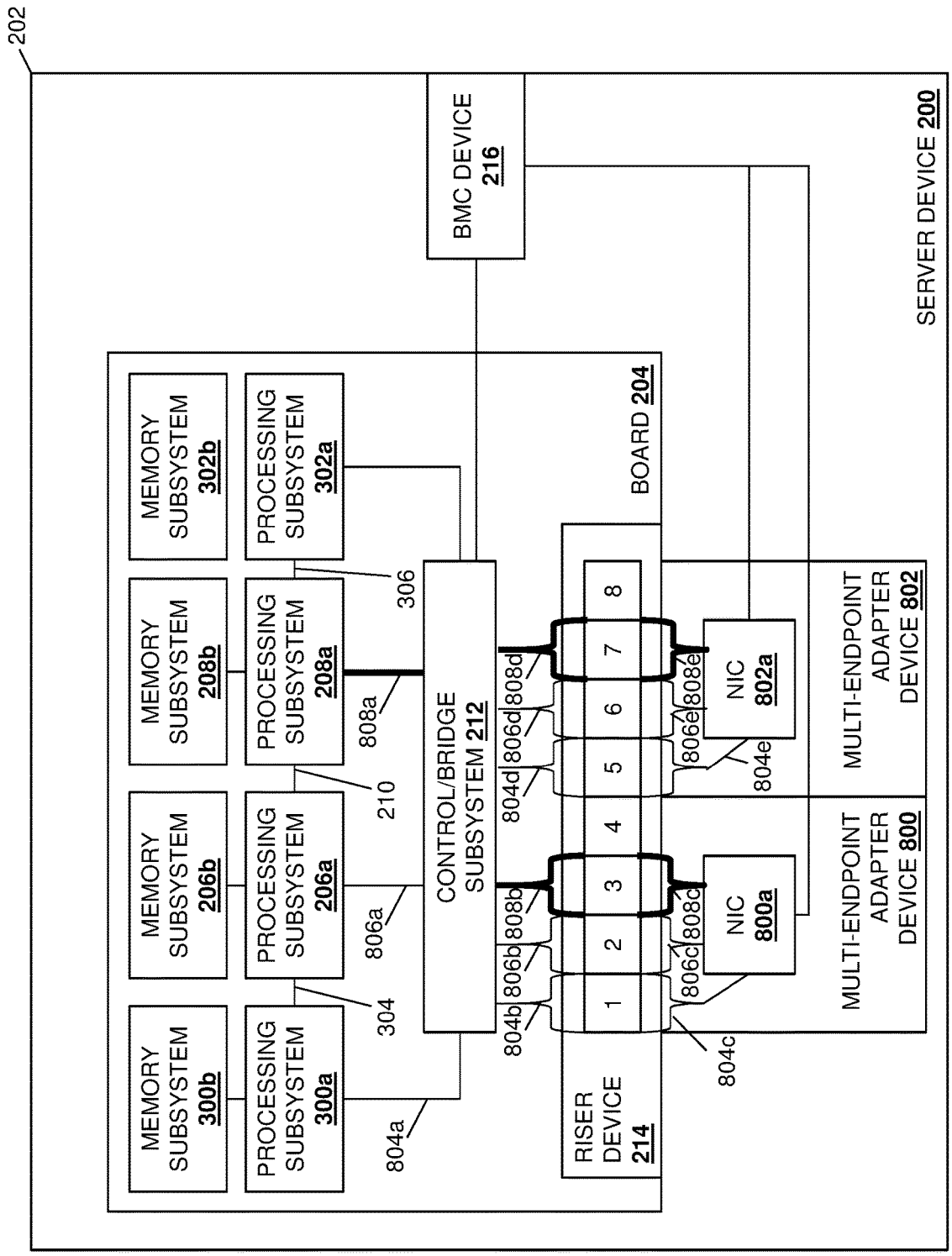
FIG. 8D is a schematic view illustrating an embodiment of processor/endpoint communication coupling configuration system in the server device of FIG. 3 configuring communication couplings during the method of FIG. 4.
Figure 8E:
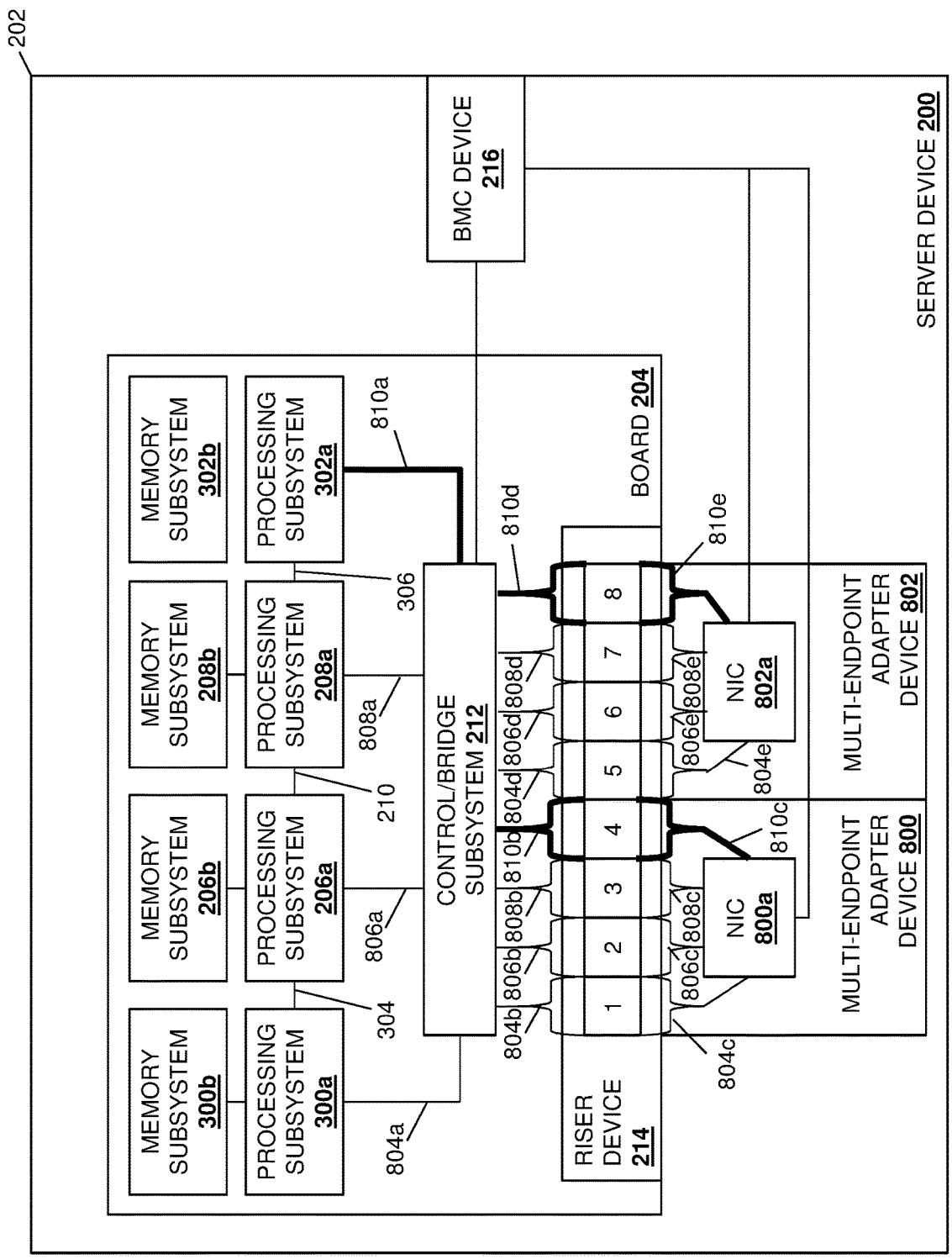
FIG. 8E is a schematic view illustrating an embodiment of processor/endpoint communication coupling configuration system in the server device of FIG. 3 configuring communication couplings during the method of FIG. 4.

FIG. 8D illustrates how the communication coupling configuration engine provided by the BMC device 216 may provide communication resources in the server device 200 to the processing subsystem 208a by configuring (or providing for the configuration of) communication couplings 808a, 808b, and 808c in order to couple the processing subsystem 208a to the NIC 800a via a x4 connection (provided by x4 connector "3" the riser device 214), and by configuring (or providing for the configuration of) communication couplings 808a, 808d, and 808e in order to couple the processing subsystem 208a to the NIC 802a via a x4 connection (provided by x4 connector "7" the riser device 214). FIG. 8E illustrates how the communication coupling configuration engine provided by the BMC device 216 may provide communication resources in the server device 200 to the processing subsystem 302a by configuring (or providing for the configuration of) communication couplings 810a, 810b, and 810c in order to couple the processing subsystem 302a to the NIC 800a via a x4 connection (provided by x4 connector "4" the riser device 214), and by configuring (or providing for the configuration of) communication couplings 810a, 810d, and 810e in order to couple the processing subsystem 302a to the NIC 802a via a x4 connection (provided by x4 connector "8" the riser device 214). As such, the example in FIGS. 8A, 8B, 8C, 8D, and 8E illustrate how each processing subsystem 206a, 208a, 300a, and 302a may be allocated redundant communication resources (a pair of x4 communication couplings in this example) to each of the NICs 800a and 802a. As such, the control/bridge subsystem 212 and/or the BMC device 216 may be configured to recognize a NIC failure, an unavailable link to one of the NICs, and/or other communication failures associated with a particular processing subsystem and, in response, may enable the redundant communication coupling to that processing subsystem.

Figure 9C:
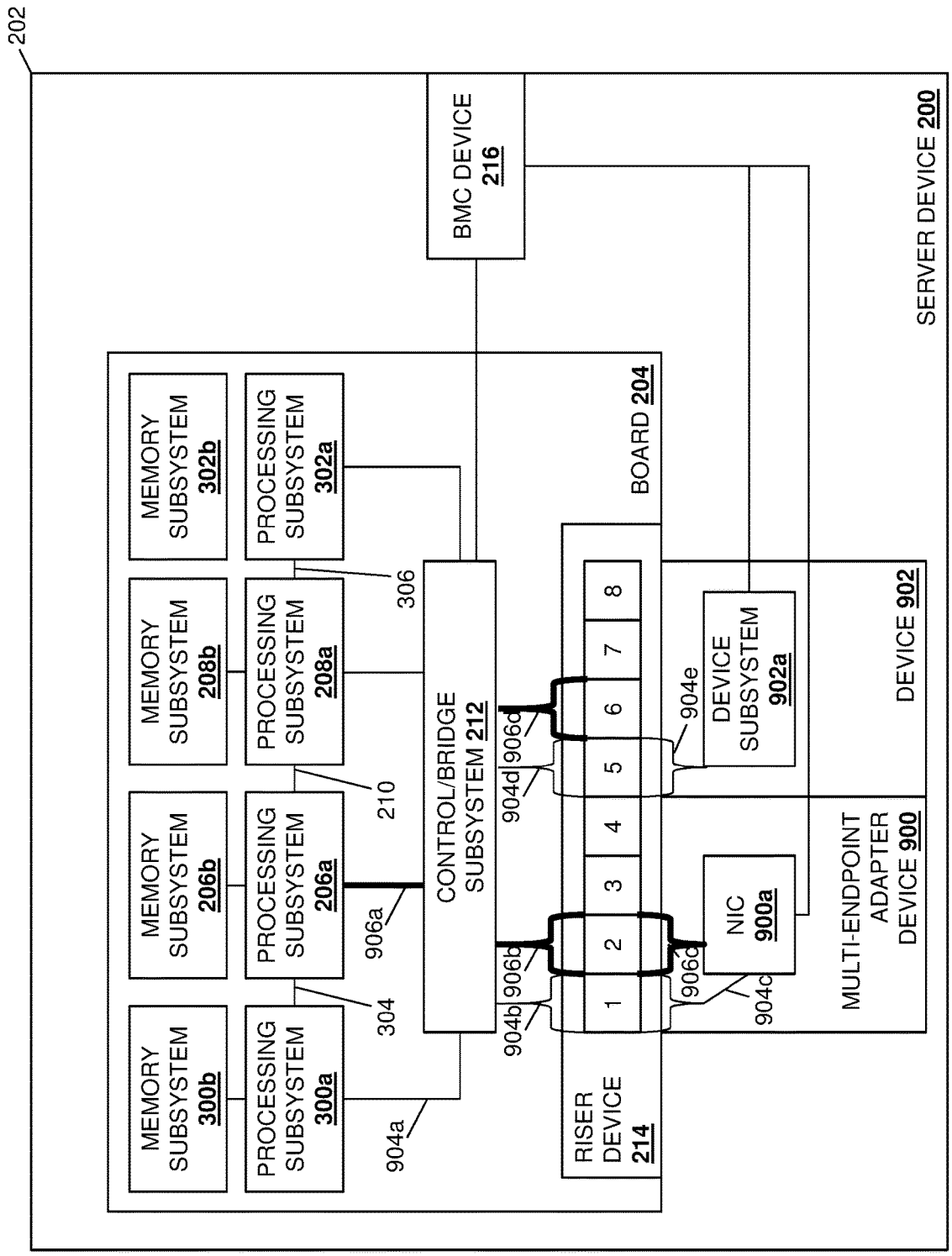
FIG. 9C is a schematic view illustrating an embodiment of processor/endpoint communication coupling configuration system in the server device of FIG. 3 configuring communication couplings during the method of FIG. 4.

With reference to example illustrated in FIGS. 9A, 9B, 9C, 9D, and 9E, FIG. 9B illustrates how the communication coupling configuration engine provided by the BMC device 216 may provide communication resources in the server device 200 to the processing subsystem 300a by configuring (or providing for the configuration of) communication couplings 904a, 904b, and 904c in order to couple the processing subsystem 300a to the NIC 900a via a x4 connection (provided by x4 connector "1" the riser device 214), and by configuring (or providing for the configuration of) communication couplings 904a, 904d, and 904e in order to couple the processing subsystem 300a to the device subsystem 902a via a x4 connection (provided by x4 connector "5" the riser device 214). FIG. 9C illustrates how the communication coupling configuration engine provided by the BMC device 216 may provide communication resources in the server device 200 to the processing subsystem 206a by configuring (or providing for the configuration of) communication couplings 906a, 906b, and 906c in order to couple the processing subsystem 206a to the NIC 900a via a x4 connection (provided by x4 connector "2" the riser device 214), and by configuring (or providing for the configuration of) communication couplings 906a and 906d in order to provide access to the multiple endpoints (e.g., the NIC 900a and the device subsystem 902a) by the processing subsystem 206a, which may provide advantages similar to those discussed above with reference to FIG. 5C.

Figure 9D:
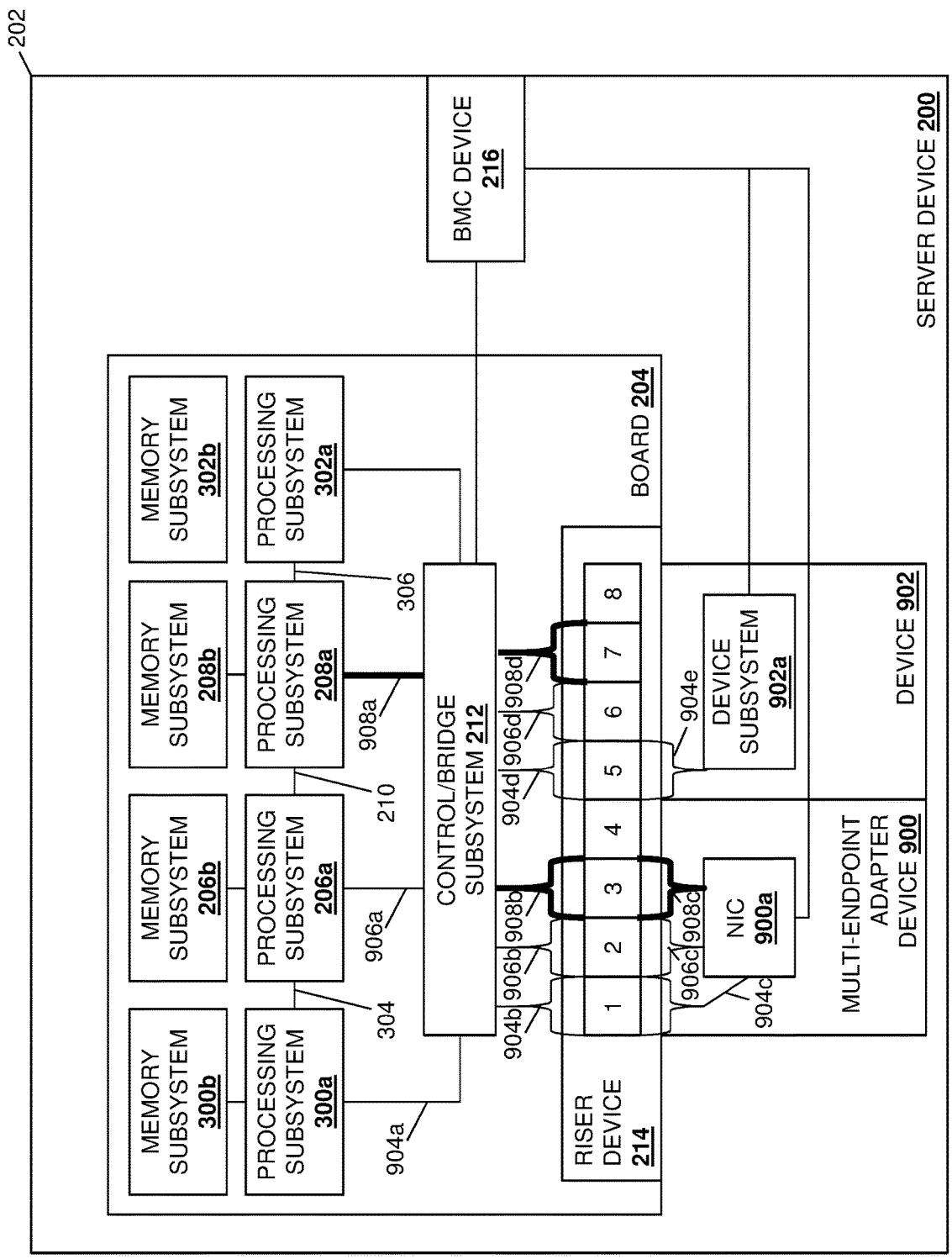
FIG. 9D is a schematic view illustrating an embodiment of processor/endpoint communication coupling configuration system in the server device of FIG. 3 configuring communication couplings during the method of FIG. 4.
Figure 9E:
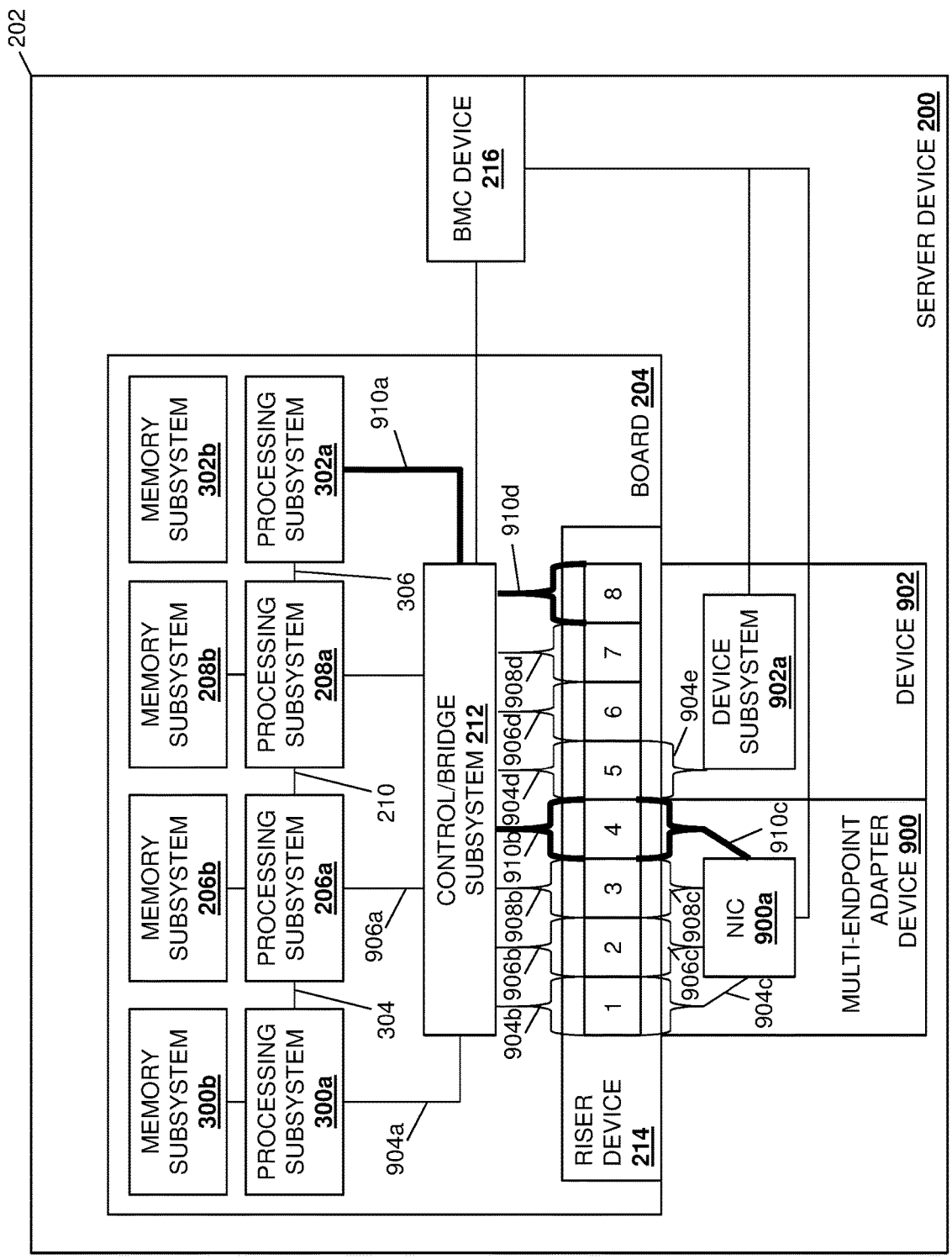
FIG. 9E is a schematic view illustrating an embodiment of processor/endpoint communication coupling configuration system in the server device of FIG. 3 configuring communication couplings during the method of FIG. 4.

FIG. 9D illustrates how the communication coupling configuration engine provided by the BMC device 216 may provide communication resources in the server device 200 to the processing subsystem 208a by configuring (or providing for the configuration of) communication couplings 908a, 908b, and 908c in order to couple the processing subsystem 208a to the NIC 900a via a x4 connection (provided by x4 connector "3" the riser device 214), and by configuring (or providing for the configuration of) communication couplings 908a and 908d in order to provide access to the multiple endpoints (e.g., the NIC 900a and the device subsystem 902a) by the processing subsystem 208a, which may provide advantages similar to those discussed above with reference to FIG. 5C. FIG. 9E illustrates how the communication coupling configuration engine provided by the BMC device 216 may provide communication resources in the server device 200 to the processing subsystem 302a by configuring (or providing for the configuration of) communication couplings 910a, 910b, and 910c in order to couple the processing subsystem 302a to the NIC 900a via a x4 connection (provided by x4 connector "4" the riser device 214), and by configuring (or providing for the configuration of) communication couplings 910a and 910d in order to provide access to the multiple endpoints (e.g., the NIC 900a and the device subsystem 902a) by the processing subsystem 302a, which may provide advantages similar to those discussed above with reference to FIG. 5C. As such, the example in FIGS. 9A, 9B, 9C, 9D, and 9E illustrate how each processing subsystem 206a, 208a, 300a, and 302a may be allocated communication resources (a x4 communication coupling in this example) to the NIC 900a, while the device subsystem 902a may be allocated communication resources (a x4 communication coupling in this example) to a single processing subsystem 300a.

Thus, systems and methods have been described that provide for the configuration of communication couplings between one or more processing subsystems in a server device and one or more endpoints coupled to those processing subsystem(s) based on the hardware that provides those communication couplings, the communication coupling configuration capability of those communication couplings, and the multi-endpoint adapter device(s) that provide the endpoint(s). In some embodiments, the configuration of communication couplings between the one or more processing subsystems in the server device and the one or more endpoints coupled to those processing subsystem(s) may be based on a retrieved user configuration policy as well. In some embodiments, the configuration of communication couplings between the one or more processing subsystems and the one or more endpoints coupled to those processing subsystem(s) may be performed and applied during runtime of the server device, while in other embodiments, the configuration of communication couplings between the one or more processing subsystems and the one or more endpoints coupled to those processing subsystem(s) may require boot operations by the server device. As such, configurable communication couplings between the processing subsystem(s) and endpoint(s) are provided that enhance the scalability of server devices (e.g., to provide additional processing subsystem in that server device) while taking into account the endpoint devices connected to those processing subsystems, allowing for hardware subsystems and their associated communication couplings to support multiple processing subsystem/endpoint configurations.

Furthermore, the present disclosure is being filed along with U.S. patent application Ser. No. 16/396,022, filed on Apr. 26, 2019, and directed to virtual machine deployment techniques; U.S. patent application Ser. No. 16/396,200, filed on Apr. 26, 2019, and directed to data splitting techniques; U.S. patent application Ser. No. 16/396,320, filed on Apr. 26, 2019, and directed to data duplicating techniques; U.S. patent application Ser. No. 16/396,453, filed on Apr. 26, 2019, and directed to packet routing techniques; U.S. patent application Ser. No. 16/396,521, filed on Apr. 26, 2019, and directed to connection configuration techniques; and U.S. patent application Ser. No. 16/395,584, filed on Apr. 26, 2019, and directed to sideband communication techniques; each of which include embodiments that utilize the multiprocessor/multi-endpoint systems described in some of the embodiments included in the present disclosure. One of skill in the art in possession of the present disclosure will recognize how embodiments of the present disclosure may be combined with some or all of the disclosures discussed above, and thus those disclosures are incorporated by reference herein in their entirety.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A processor/endpoint communication coupling configuration system, comprising:
  a plurality of processing subsystems that are coupled together via at least one processor interconnect that allows a first processing subsystem included in the plurality of processing subsystems to access memory that is local to a second processing subsystem included in the plurality of processing subsystems via that at least one processor interconnect;
  a first multi-endpoint adapter device;
  at least one hardware subsystem that includes a plurality of communication couplings that couple the plurality of processing subsystems to the first multi-endpoint adapter device; and
  a communication coupling configuration engine that is coupled to the first multi-endpoint adapter device and the at least one hardware subsystem, wherein the communication coupling configuration engine is configured to:
    identify each at least one hardware subsystem that includes the plurality of communication couplings that couple the plurality of processing subsystems to the first multi-endpoint adapter device;
    determine at least one first multi-endpoint adapter device capability of the first multi-endpoint adapter device;
    retrieve at least one first user configuration policy; and
    configure the plurality of communication couplings based on the at least one hardware subsystem, the at least one first user configuration policy, and the at least one first multi-endpoint adapter device capability, wherein the configuration of the plurality of communication couplings provides at least one communication resource between at least one of the plurality of processing subsystems and at least one endpoint on the first multi-endpoint adapter device without the use of the at least one processor interconnect for communications between that at least one of the plurality of processing subsystems and the at least one endpoint on the first multi-endpoint adapter device.

2. The system of claim 1, wherein the communication coupling configuration engine is configured to:
determine at least one communication coupling configuration capability of the plurality of communication couplings that couple the plurality of processing subsystems to the first multi-endpoint adapter device, wherein the configuration of the plurality of communication couplings is also based on the at least one communication coupling configuration capability.

3. The system of claim 1, wherein the communication coupling configuration engine is configured to:
cause, following the configuration of the plurality of communication couplings, at least one boot operation to be performed, wherein the configuration of the plurality of communication couplings that provides the at least one communication resource between the at least one of the plurality of processing subsystems and the at least one endpoint on the first multi-endpoint adapter device takes effect following the boot operations.

4. The system of claim 1, wherein the communication coupling configuration engine is configured to:
perform the configuration of the plurality of communication couplings during runtime operations, wherein the configuration of the plurality of communication couplings that provides the at least one communication resource between the at least one of the plurality of processing subsystems and the at least one endpoint on the first multi-endpoint adapter device takes effect during the runtime operations.

5. The system of claim 1, further comprising:
a second multi-endpoint adapter device that is coupled to the plurality of processing subsystems via the plurality of communications couplings included in the at least one hardware subsystem, wherein the communication coupling configuration engine is configured to:
identify each at least one hardware subsystem that includes the plurality of communication couplings that couple the plurality of processing subsystems to the second multi-endpoint adapter device;
determine at least one second multi-endpoint adapter device capability of the second multi-endpoint adapter device;
retrieve at least one second user configuration policy; and
configure the plurality of communication couplings based on the at least one hardware subsystem, the at least one second user configuration policy, and the at least one second multi-endpoint adapter device capability, wherein the configuration of the plurality of communication couplings provides at least one communication resource between at least one of the plurality of processing subsystems and at least one endpoint on the second multi-endpoint adapter device.

6. The system of claim 1, further comprising:
a Baseboard Management Controller (BMC) device that is coupled to the first multi-endpoint adapter device and the at least one hardware subsystem, wherein the BMC device provides the communication coupling configuration engine.

7. An Information Handling System (IHS), comprising:
a first processing system; and
a first memory system that is coupled to the first processing system and that includes instructions that, when executed by the first processing system, cause the first processing system to provide a communication coupling configuration engine that is configured to:
identify at least one hardware subsystem that includes a plurality of communication couplings that couple a plurality of second processing subsystems to a first multi-endpoint adapter device, wherein the plurality of second processing subsystems are coupled together via at least one processor interconnect that allows the first processing system to access respective memory that is local to each second processing subsystem included in the plurality of second processing subsystems;
retrieve at least one first user configuration policy;
determine at least one first multi-endpoint adapter device capability of the first multi-endpoint adapter device; and
configure the plurality of communication couplings based on the at least one hardware subsystem, the at least one first user configuration policy, and the at least one first multi-endpoint adapter device capability, wherein the configuration of the plurality of communication couplings provides at least one communication resource between at least one of the plurality of second processing subsystems and at least one endpoint on the first multi-endpoint adapter device that without the use of the at least one processor interconnect for communications between that at least one of the plurality of second processing subsystems and the at least one endpoint on the first multi-endpoint adapter device.

8. The IHS of claim 7, wherein the communication coupling configuration engine is configured to:
determine at least one communication coupling configuration capability of the plurality of communication couplings that couple the plurality of second processing subsystems to the first multi-endpoint adapter device, wherein the configuration of the plurality of communication couplings is also based on the at least one communication coupling configuration capability.

9. The IHS of claim 7, wherein the communication coupling configuration engine is configured to:
cause, following the configuration of the plurality of communication couplings, at least one boot operation to be performed, wherein the configuration of the plurality of communication couplings that provides the at least one communication resource between the at least one of the plurality of second processing subsystems and the at least one endpoint on the first multi-endpoint adapter device takes effect following the boot operations.

10. The IHS of claim 7, wherein the communication coupling configuration engine is configured to:
perform the configuration of the plurality of communication couplings during runtime operations, wherein the configuration of the plurality of communication couplings that provides the at least one communication resource between the at least one of the plurality of second processing subsystems and the at least one endpoint on the first multi-endpoint adapter device takes effect during the runtime operations.

11. The IHS of claim 7, wherein the communication coupling configuration engine is configured to:

identify the at least one hardware subsystem that includes the plurality of communication couplings that couple the plurality of second processing subsystems to a second multi-endpoint adapter device;

retrieve at least one second user configuration policy;

determine at least one second multi-endpoint adapter device capability of the second multi-endpoint adapter device; and configure the plurality of communication couplings based on the at least one hardware subsystem, the at least one second user configuration policy, and the at least one second multi-endpoint adapter device capability, wherein the configuration of the plurality of communication couplings provides at least one communication resource between at least one of the plurality of second processing subsystems and at least one endpoint on the second multi-endpoint adapter device.

12. The IHS of claim 7, wherein the first processing system and the first memory system are provided in a Baseboard Management Controller (BMC) device.

13. The IHS of claim 7, wherein the at least one communication resource provided between the at least one of the plurality of second processing subsystems and the at least one endpoint on the first multi-endpoint adapter device includes providing each of the plurality of second processing subsystems redundant communication resources to at least two endpoints.

14. A method for configuring communication couplings between processors and endpoints, comprising:

identifying, by a communication coupling configuration subsystem, at least one hardware subsystem that includes a plurality of communication couplings that couple a plurality of processing subsystems to a first multi-endpoint adapter device, wherein the plurality of processing subsystems are coupled together via at least one processor interconnect that allows a first processing subsystem included in the plurality of processing subsystems to access memory that is local to a second processing subsystem included in the plurality of processing subsystems;

retrieving, by the communication coupling configuration subsystem, at least one first user configuration policy;

determining, by the communication coupling configuration subsystem, at least one first multi-endpoint adapter device capability of the first multi-endpoint adapter device; and configuring, by the communication coupling configuration subsystem, the plurality of communication couplings based on the at least one hardware subsystem, the at least one first user configuration policy, and the at least one first multi-endpoint adapter device capability, wherein the configuration of the plurality of communication couplings provides at least one communication resource between at least one of the plurality of processing subsystems and at least one endpoint on the first multi-endpoint adapter device that without the use of the at least one processor interconnect for communications between that at least one of the plurality of processing subsystems and the at least one endpoint on the first multi-endpoint adapter device.

15. The method of claim 14, further comprising:

determining, by the communication coupling configuration subsystem, at least one communication coupling configuration capability of the plurality of communication couplings that couple the plurality of processing subsystems to the first multi-endpoint adapter device, wherein the configuration of the plurality of communication couplings is also based on the at least one communication coupling configuration capability.

16. The method of claim 14, further comprising:

causing, by the communication coupling configuration subsystem following the configuration of the plurality of communication couplings, at least one boot operation to be performed, wherein the configuration of the plurality of communication couplings that provides the at least one communication resource between the at least one of the plurality of processing subsystems and the at least one endpoint on the first multi-endpoint adapter device takes effect following the boot operations.

17. The method of claim 14, further comprising:

performing, by the communication coupling configuration subsystem, the configuration of the plurality of communication couplings during runtime operations, wherein the configuration of the plurality of communication couplings that provides the at least one communication resource between the at least one of the plurality of processing subsystems and the at least one endpoint on the first multi-endpoint adapter device takes effect during the runtime operations.

18. The method of claim 14, further comprising:

identifying, by the communication coupling configuration subsystem, the at least one hardware subsystem that includes the plurality of communication couplings that couple the plurality of processing subsystems to a second multi-endpoint adapter device;

retrieving, by the communication coupling configuration subsystem, at least one second user configuration policy;

determining, by the communication coupling configuration subsystem, at least one second multi-endpoint adapter device capability of the second multi-endpoint adapter device; and configuring, by the communication coupling configuration subsystem, the plurality of communication couplings based on the at least one hardware subsystem, the at least one second user configuration policy, and the at least one second multi-endpoint adapter device capability, wherein the configuration of the plurality of communication couplings provides at least one communication resource between at least one of the plurality of processing subsystems and at least one endpoint on the second multi-endpoint adapter device.

19. The method of claim 14, wherein a Baseboard Management Controller (BMC) device provides the communication coupling configuration engine.

20. The method of claim 14, wherein the at least one communication resource provided between the at least one of the plurality of processing subsystems and the at least one endpoint on the first multi-endpoint adapter device includes providing each of the plurality of processing subsystems redundant communication resources to at least two endpoints.

* * * * *

UNITED STATES PATENT AND TRADEMARK OFFICE
CERTIFICATE OF CORRECTION

PATENT NO. : 11,093,422 B2
APPLICATION NO. : 16/741361
DATED : August 17, 2021
INVENTOR(S) : Lambert et al.

Page 1 of 1

It is certified that error appears in the above-identified patent and that said Letters Patent is hereby corrected as shown below:

In the Claims

Claim 7, Column 22, Line 31, "that" after "device" should be deleted;

Claim 14, Column 23, Line 56, "that" after "device" should be deleted.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*